(12) United States Patent
Kosuge et al.

(10) Patent No.: US 8,414,050 B2
(45) Date of Patent: Apr. 9, 2013

(54) PICK-UP STYLE UTILITY VEHICLE WITH EXPANDABLE CARGO BED

(75) Inventors: Hideyoshi Kosuge, Kobe (JP); Tokishin Nishinaka, Kakogawa (PA); Geoffrey Ewing, Lincoln, NE (US); Yoji Onishi, Kobe (JP); Takao Hamano, Kobe (JP); Naohisa Masuda, Kobe (JP); Kenji Oda, Akashi (JP); Takeshi Orio, Akashi (JP); Michael John Boyle, Lincoln, NE (US); Tatsunori Shimizu, Akashi (JP); Eiji Sakurada, Kobe (JP); Mitsuhiro Yazaki, Kakogawa (JP); Yui Nishizaki, Akashi (JP); Hiroyuki Kishi, Akashi (JP); Naoto Nakagawa, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 507 days.

(21) Appl. No.: 12/644,523

(22) Filed: Dec. 22, 2009

(65) Prior Publication Data

US 2011/0148144 A1     Jun. 23, 2011

(51) Int. Cl.
*B62D 33/02* (2006.01)
(52) U.S. Cl. ............... 296/24.43; 296/26.08; 296/26.09; 296/26.1; 296/183.1; 296/64; 296/65.09
(58) Field of Classification Search ................... 296/165, 296/171, 175, 24.3, 24.33, 24.4, 24.43, 26.08, 296/62.09, 26.1, 26.11, 183.1, 183.2, 190.03, 296/191, 37.6, 64, 65.01, 66, 65.09, 26.09; 280/756, 749
See application file for complete search history.

(56) References Cited

U.S. PATENT DOCUMENTS

| | | | |
|---|---|---|---|
| 6,478,355 B1 * | 11/2002 | Van Eden et al. | 296/37.6 |
| 6,905,159 B1 | 6/2005 | Saito et al. | |
| 6,994,388 B2 | 2/2006 | Saito et al. | |
| 7,249,798 B2 | 7/2007 | Saito et al. | |
| 7,581,780 B2 * | 9/2009 | Shimamura et al. | 296/183.2 |
| 2009/0256388 A1 * | 10/2009 | Tanaka et al. | 296/186.4 |
| 2010/0308614 A1 * | 12/2010 | Arnold | 296/37.6 |
| 2011/0156429 A1 * | 6/2011 | Shimizu et al. | 296/26.09 |

* cited by examiner

*Primary Examiner* — Jason S Morrow
(74) *Attorney, Agent, or Firm* — Wenderoth, Lind & Ponack, L.L.P.

(57) ABSTRACT

A pick-up style utility vehicle according to the present invention has a front seat, a rear seat, a cargo bed expandable in a front direction, and a screen shield arranged at a front end of the cargo bed. The cargo bed has at least a stationary bottom plate, right and left stationary side panels, a front panel, expandable side panels, and an expandable bottom plate and can be changed between an expanded state in which the cargo bed is expanded in a front direction to a rear portion riding space and a non-expanded state not occupying the space. Each of the expandable side panels and the screen shield are supported by a vehicle body configuring portion so as to be integrally shifted between an expanded position and a non-expanded position.

5 Claims, 23 Drawing Sheets

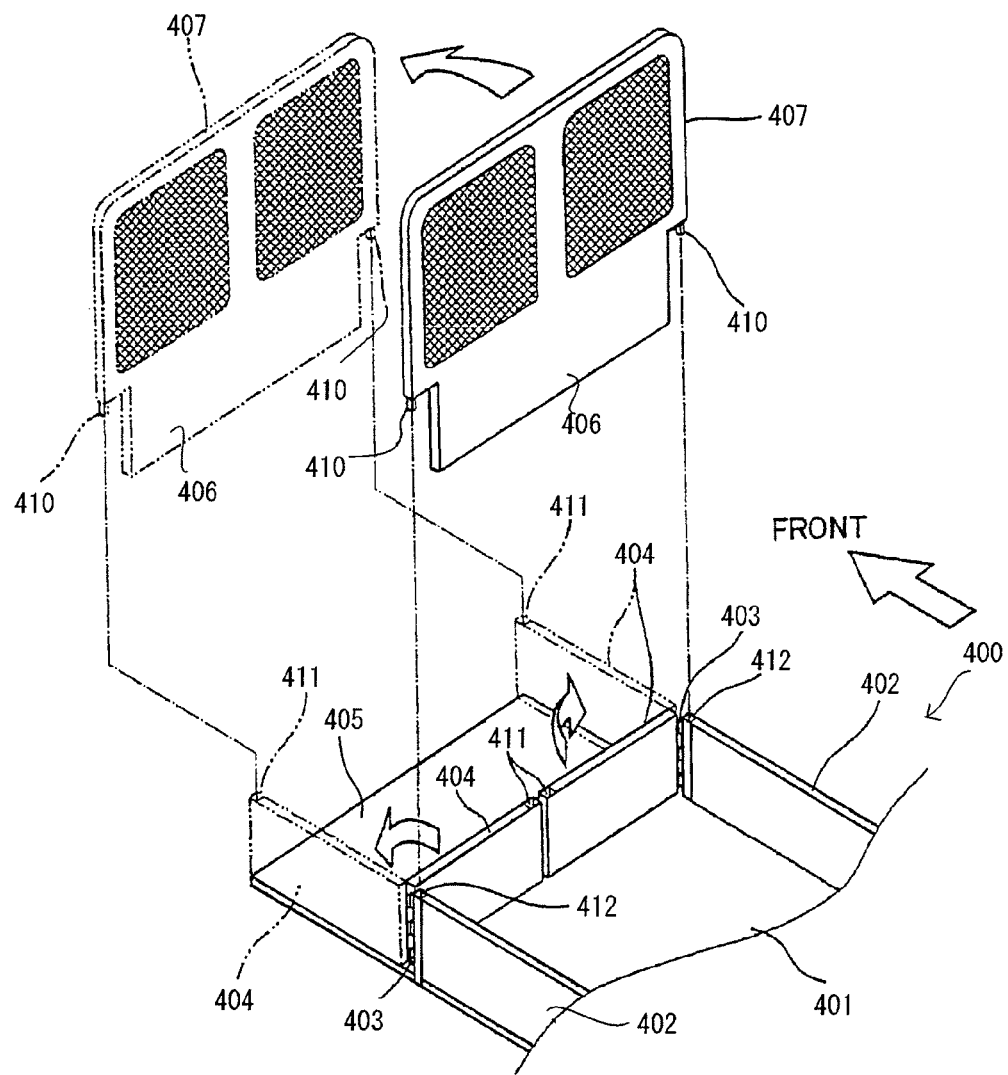

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 31 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 31, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify expanding and contracting operations of a cargo bed and a moving operation of a screen shield therewith, thereby performing the operations easily and immediately even by one operator.

Another object of the present invention is to easily change a state of a rear seat with the expanding or contracting operation of the cargo bed.

To achieve the above objects, the present invention provides a pick-up style utility vehicle including a front seat, a rear seat, and a cargo bed in this order from front, and a screen shield partitioning the cargo bed and a riding space in front of the cargo bed, wherein the cargo bed has at least a stationary bottom plate, right and left stationary side panels, a front panel movable to the riding space, expandable side panels expandable to the riding space, and an expandable bottom plate expandable to the riding space, and is changed between an expanded state in which the cargo bed is expanded in a front direction to the riding space and a non-expanded state not occupying the riding space, and each of the expandable side panels and the screen shield or the expandable bottom plate and the screen shield are supported by a vehicle body configuring portion so as to be integrally shifted between an expanded position and a non-expanded position.

With the above configuration, in the expanding or contracting operation of the cargo bed, the screen shield can be changed between the expanded position and the non-expanded position without being lifted. The position of the screen shield can be easily changed by one operator. The changing operation of the expandable side panels between the expanded position and the non-expanded position can change the screen shield between the non-expanded position and the expanded position at the same time. Thus, the number of steps of the changing operation can be reduced.

According to the present invention, preferably, each of the expandable side panels is supported by the vehicle body configuring member so as to slide in a front or rear direction, and the screen shield is fixed at or integrally provided with a front end of the expandable side panel.

With the above configuration, by sliding the expandable side panel in a front or rear direction, the screen shield is moved in a front or rear direction together therewith. Thus, in the expanding or contracting operation of the cargo bed, the operating space for shifting the expandable side panel is small.

According to the present invention, preferably, the vehicle body configuring member slidably supporting the expandable side panel is the stationary side panel.

With the above configuration, when the expandable side panel is shifted to the non-expanded position, a double panel or wall is configured by the expandable side panel and the stationary side panel. Thus, rigidity of the entire side panel can be increased.

According to the present invention, preferably, the vehicle body configuring member slidably supporting the expandable side panel is the stationary bottom plate and the expandable bottom plate.

With the above configuration, the supporting configuration of the expandable side panel can be simplified.

According to the present invention, in the configuration slidably supporting the expandable side panel by the stationary side panel or the stationary bottom plate, the expandable side panel is located on an inner side of the stationary side panel in a vehicle width direction when the cargo bed is not expanded.

With the above configuration, when the cargo bed is expanded, the expandable side panel is supported by a portion of the stationary side panel from the outer side in a vehicle width direction relative to the pressure of a load to be loaded. Thus, a strength to the load can be maintained high.

According to the present invention, in the configuration slidably supporting the expandable side panel by the stationary side panel or the stationary bottom plate, the expandable side panel is located on an outer side of the stationary side panel in a vehicle width direction when the cargo bed is not expanded.

With the above configuration, the expandable side panel can be slidably smoothly moved at all times without being disturbed by a load such as sand in the cargo bed.

According to the present invention, in the configuration slidably supporting the expandable side panel by the stationary side panel or the stationary bottom plate, the expandable side panel is retracted in the stationary side panel formed in a hollow shape when the cargo bed is not expanded.

With the above configuration, when the cargo bed is not expanded, the expandable side panel is hidden in the stationary side panel. Thus, an appearance can be improved, and the expandable side panel can be slidably smoothly moved without being disturbed by a load such as sand in the cargo bed.

According to the present invention, the expandable bottom plate is shifted between the expanded position where the expandable bottom plate is located in the riding space and the non-expanded position where the expandable bottom plate is not located in the riding space.

With the above configuration, in the non-expanded state, the expandable side panel is removed from the riding space. Thus, a degree of freedom of arrangement of the rear seat is increased.

According to the present invention, the expandable bottom plate is located in the riding space at all times and is retracted underneath the rear seat when the cargo bed is not expanded.

With the above configuration, the stationary bottom plate and the expandable bottom plate can be integrally formed to facilitate manufacture.

According to the present invention, each of the expandable side panels is coupled to the front end of each of the stationary side panels so as to rotate about a vertical axis via a hinge and is shifted between the expanded position where the expandable side panel is protruded in a front direction from the stationary side panel and the non-expanded position where the expandable side panel is not protruded in a front direction from the front end of the stationary side panel, the screen shield is integrally provided with the front panel and is supported by the expandable bottom plate so as to slide in a front or rear direction, and the front panel and each of the expandable side panels are coupled by an interlocking mechanism.

With the above configuration, the three members of the expandable side panel, the front panel, and the screen shield can be changed between the expanded position and the non-expanded position by one operation. As a result, the operability is improved.

According to the present invention, the rear seat is changed between a used state in which a passenger is seated and a retracted state in which the cargo bed is expanded, and the rear seat and the expandable side panel is coupled by an interlocking mechanism so that the expandable side panel is changed between the non-expanded position and the expanded position with the change of the rear seat between the used state and the retracted state. Preferably, a link mechanism or a hinge pin is used as the interlocking mechanism.

With the above configuration, the changing operation of the rear seat between the used state and the retracted state and the expanding and contracting operations of the cargo bed can be performed by one operation. As a result, the operability is be improved.

BRIEF DESCRIPTION OF THE DRAWINGS

FIG. 31 is a perspective view of a related prior art.

DETAILED DESCRIPTION OF THE PREFERRED EMBODIMENTS

First Embodiment of the Present Invention

Figure 1:
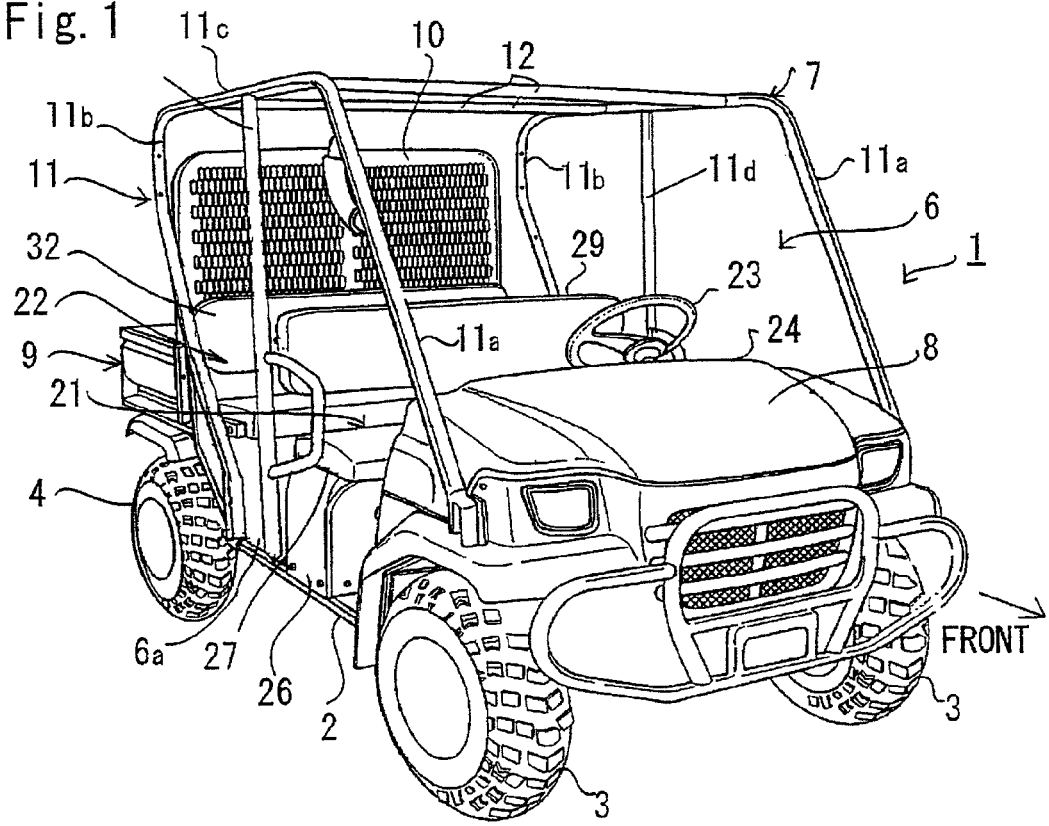
FIG. 1 is an overall perspective view of a pick-up style utility vehicle according to a first embodiment of the present invention.
Figure 2:
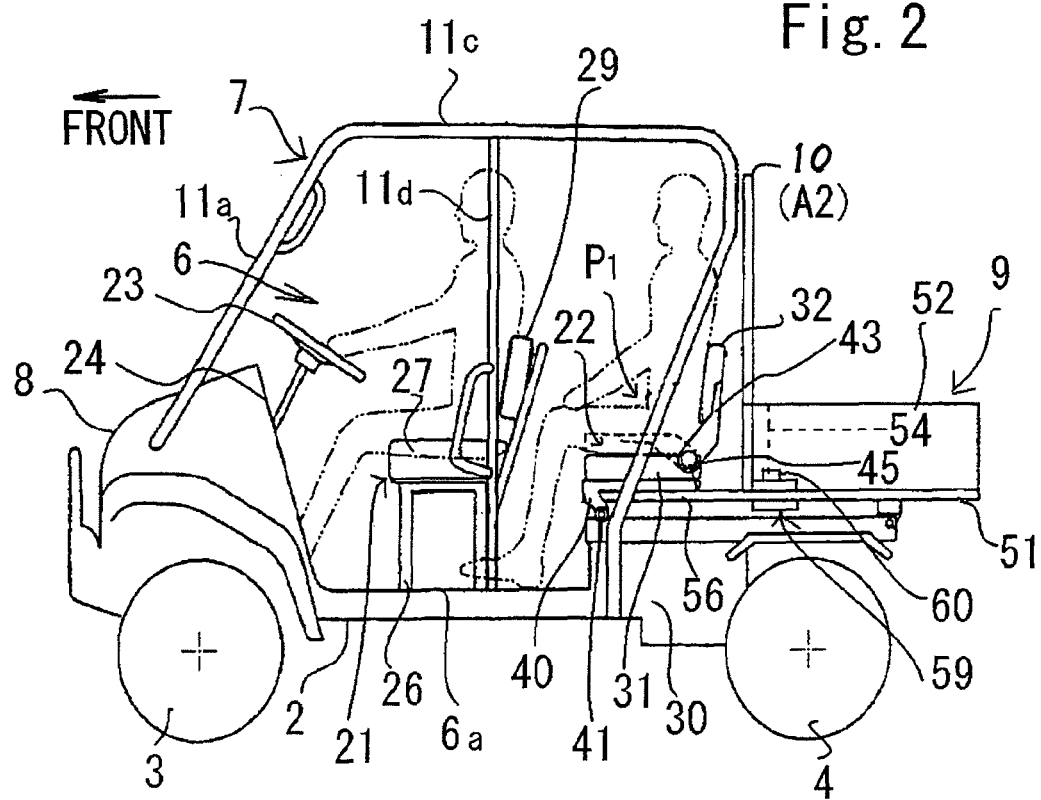
FIG. 2 is a left side view of the pick-up style utility vehicle of FIG. 1 when a cargo bed is not expanded.
Figure 3:
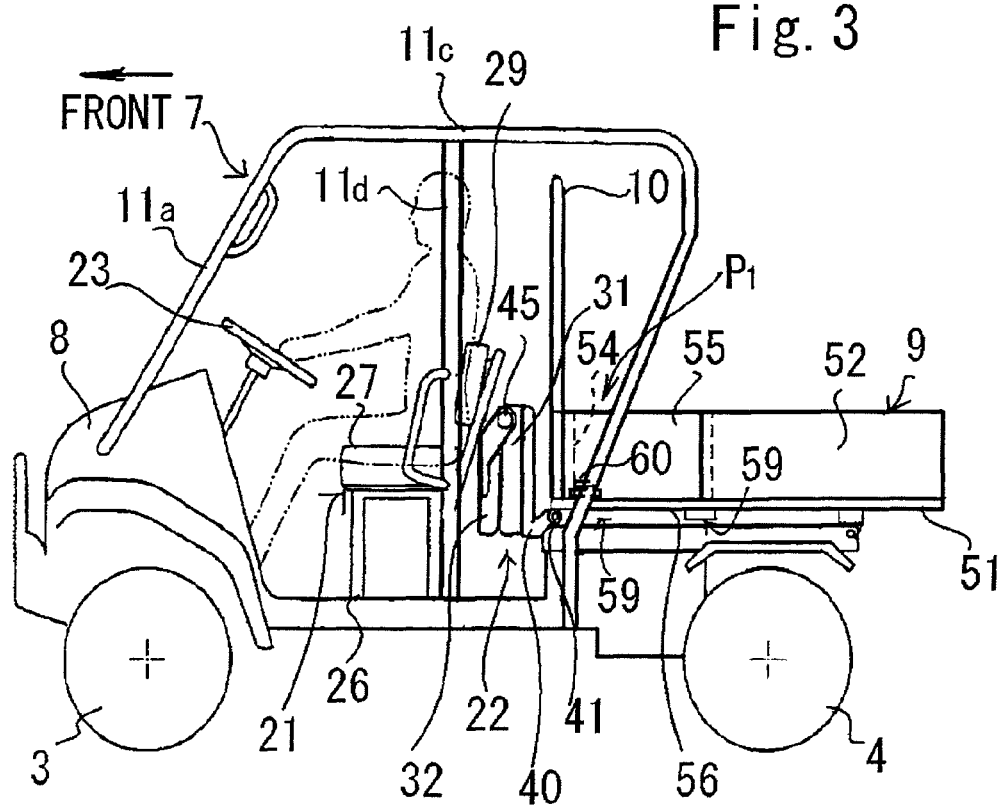
FIG. 3 is a left side view of the pick-up style utility vehicle of FIG. 1 when the cargo bed is expanded.

FIGS. 1 to 5 show a pick-up style utility vehicle with an expandable cargo bed according to a first embodiment of the present invention. The pick-up style utility vehicle can be changed between 4 passengers transformation contracting a cargo bed 9, as shown in FIG. 2 and 2 passengers transformation folding a rear seat 22 and expanding the cargo bed 9 in a front direction, as shown in FIG. 3. A configuration of the pick-up style utility vehicle will be described below in detail with reference to the drawings.

FIG. 1 is a perspective view of the pick-up style utility vehicle. A pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front or rear direction. A hood 8 is provided in front of the cabin frame 7. The cargo bed 9 is provided behind the cabin frame 7. A screen shield 10 partitioning the cargo bed 9 and a riding space is provided at a front end of the cargo bed 9 so as to be adjustable in a front or rear direction.

The cabin frame 7 surrounding the cabin 6 has a pair of right and left side frame members 11 formed in a U shape and made of a metal pipe, and a plurality of cross frame members 12 made of a metal pipe coupling the side frame members 11. Each of the side frame members 11 has a front side portion 11a extended in a rear direction and in an upward direction from near the right or left side portion of the hood 8, a rear side portion 11b extended in a substantially upward direction from the right or left side portion at the rear end of the cabin 6, an upper side portion 11c integrally coupling the upper end of the front side portion 11a and the upper end of the rear side portion 11b and extended in a front or rear direction, and an intermediate longitudinal portion 11d coupling the intermediate portion of the upper side portion 11c in a front or rear direction and a floor surface 6a.

A bench-shaped front seat 21 is installed in the front half of the cabin 6. The bench-shaped rear seat 22 of a folding type is installed in the rear half portion of the cabin 6. A dashboard (operating portion) 24 having a steering wheel 23 and the like is provided at the front end of the cabin 6.

FIG. 2 is a left side view of the pick-up style utility vehicle in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portion 11d. The bench-shaped front seat 21 is typically extended in a right or left direction to near the right or left end of the cabin 6. With this configuration, two persons can be seated side by side. A driver can be seated on one of seating areas (left side) and a passenger can be seated on the other seating area. The bench-shaped rear seat 22 has a seat bottom 31 arranged on the upper side of a box 30 housing an engine (not shown), and a backrest 32 (the configuration will be described later in detail). As in the front seat 21, the seat bottom 31 and the backrest 32 are extended in a right or left direction to near the right or left end of the cabin 6. Therefore, two passengers can be seated side by side.

The folding configuration of the rear seat 22 will be described in detail. The seat bottom 31 is fixed onto the upper surface of a supporting base 40. The front end of the supporting base 40 is rotatably supported at the front upper end of the box 30 via a hinge 41. A pair of right and left stays 43 extended in a downward direction is fixed onto the backrest 32. The lower end of each of the stays 43 is rotatably coupled to the rear end of the seat bottom 31 via a hinge 45.

FIG. 3 shows a folding state of the rear seat 21. The backrest 32 is rotated about the hinge 45 so as to be brought into contact with the upper surface of the seat bottom 31. The seat bottom 31 is then rotated about the hinge 41 together with the backrest 32 so as to be substantially vertical. The rear seat 22 is folded in the retracted state of FIG. 3. The rear seat 22 is folded and retracted to use a rear portion riding space P1 as the forward expanded space of the cargo bed 9.

Figure 4:
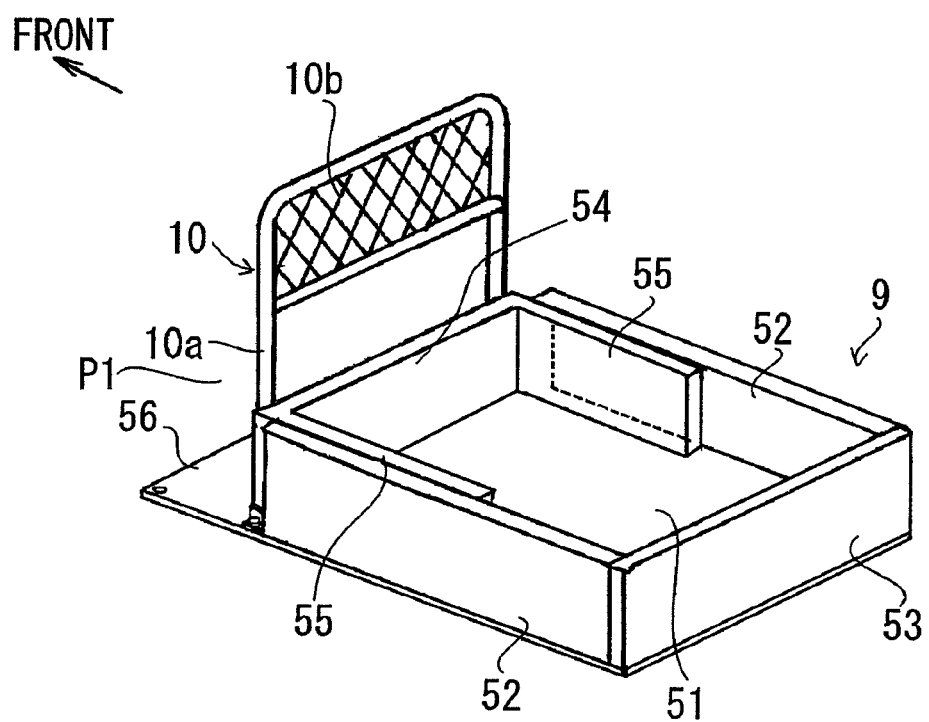
FIG. 4 is a perspective view showing the cargo bed of the pick-up style utility vehicle of FIG. 1 when the cargo bed is not expanded.

A configuration of the expandable cargo bed 9 will be described in detail. FIG. 4 is a simplified perspective view of the expandable cargo bed 9 and the screen shield 10. The screen shield 10 has a frame 10a formed in a U shape and made of a metal pipe, and a resin or metal net 10b provided in the frame 10a. The cargo bed 9 has, as a basic configuration, a stationary bottom plate 51, a pair of stationary side panels 52 provided substantially perpendicular to the stationary bottom plate 51 along the right and left ends of the stationary bottom plate 51, a gate type rear panel 53 provided at the rear end of the stationary bottom plate 51 so as to be opened and closed, and a front panel 54 adjustable in a front or rear direction. In addition to these members, to expand the cargo bed 9 in a front direction, the cargo bed 9 has a pair of right and left expandable side panels 55, and an expandable bottom plate 56 extended in a front direction from the front end of the stationary bottom plate 51.

According to the first embodiment, the expandable bottom plate 56 is integral with the stationary bottom plate 51 and is extended in a front direction on the same plane as that of the stationary bottom plate 51 from the front end of the stationary bottom plate 51 into the rear portion riding space P1. The pair of expandable side panels 55 is arranged on the vehicle width center side of the stationary side panels 52 (the space side in the cargo bed) and is integrally formed with the front panel 54. The expandable side panels 55 and the front panel 54 are supported so as to be slidable on the upper surfaces of the stationary bottom plate 51 and the expandable bottom plate 56 in a front or rear direction. The frame 10a of the screen shield 10 is fixed onto the front panel 54. With this configuration, the screen shield 10 can be moved in a front or rear direction so as to be integral with the front panel 54 and the right and left expandable side panels 55.

Figure 5:
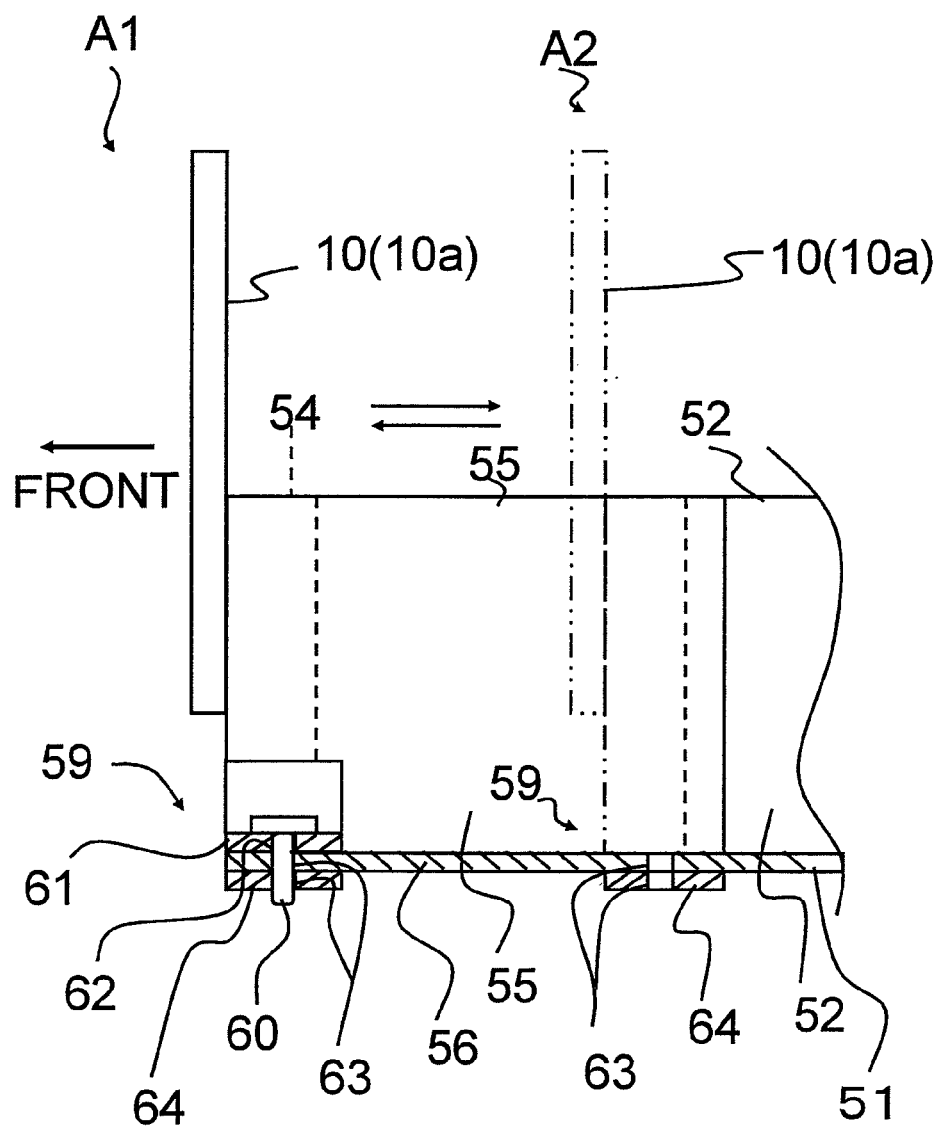
FIG. 5 is a cross-sectional view showing an example of a lock mechanism of an expandable side panel.

FIG. 5 is a left side view of the expanded cargo bed 9. The front panel 54 and the right and left expandable side panels 55 are slidable in a front or rear direction between an expanded position A1 indicated by a solid line and a non-expanded position A2 indicated by an imaginary line. The front panel 54 is located at the substantially front end of the expandable bottom plate 56 in the expanded position A1 and is located at the substantially front end of the stationary bottom plate 51 in the non-expanded position A2.

A fixing mechanism 59 for fixing the front panel 54 and the expandable side panel 55 in the respective positions A1 and A2 are provided at the front end of the expandable side panel 55 and the right or left end of the expandable bottom plate 56. The fixing mechanism 59 has a lock section 61 provided at the front end of the expandable side panel 55 (the right or left end of the front panel 54) and having a pin insertion hole 62, a lock section 64 formed in the front portion of the right or left end of the expandable bottom plate 56 and having a positioning hole 63, and the lock section 64 formed at the front end of the right or left end of the stationary bottom plate 51 and having the positioning hole 63. In the expanded position A1, a pin 60 is inserted into the pin insertion hole 62 and the positioning hole 63 at the front end of the expandable bottom plate 56, thereby the front panel 54, the right or left expandable side panel 55, and the screen shield 10 can be fixed in the expanded position A1. In the non-expanded position A2, the pin 60 is inserted into the pin insertion hole 62 at the front end of the expandable side panel 55 and the positioning hole 63 of the stationary bottom plate 51. The front panel 54, the right or left expandable side panel 55, and the screen shield 10 can be fixed in the non-expanded position A2.

Figure 6:
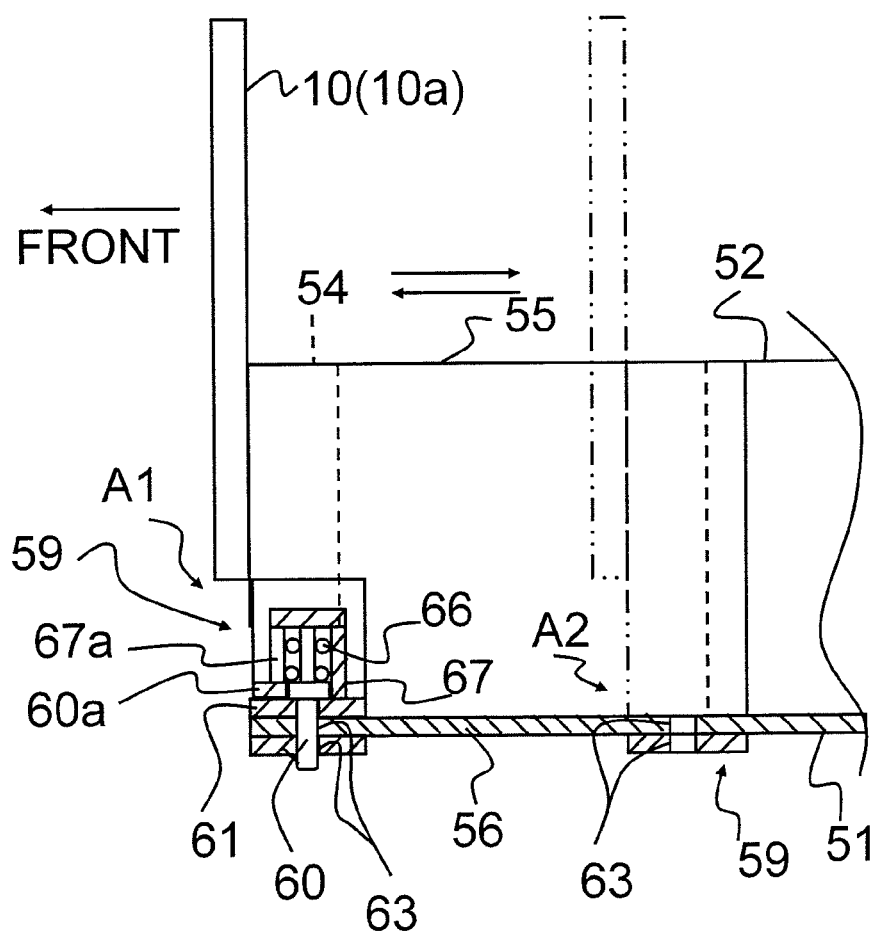
FIG. 6 is a cross-sectional view showing another example of the lock mechanism of the expandable side panel.

FIG. 6 shows another example of the pin type fixing mechanism. The pin 60 is forced in a downward direction by a spring 66. The spring 66 is housed in a housing 67 provided on the lock section 61. The pin 60 is integrally formed with a pinching section 60a protruded from the housing 67 through a slit 67a to the outside of the housing 67.

The pin 60 is pulled up by pinching the pinching section 60a and is then pulled out from the positioning hole 63 in one of the positions A1 and A2. The front panel 54 and the expandable side panel 55 are slid in a front or rear direction. In the other position A2 or A1, the pin 60 is automatically inserted into the pin positioning hole 63 by the spring 66. The front panel 54 and the expandable side panel 55 are fixed in the other position A2 or A1.

A changing operation from the 4 passengers transformation shown in FIG. 2 to the 2 passengers transformation shown in FIG. 3 and an expanding operation of the cargo bed 9 will be described.

In the 4 passengers transformation shown in FIG. 2, the supporting base 40 and the seat bottom 31 of the rear seat 22 are located above the expandable bottom plate 56 and the backrest 32 is raised in an upward direction. The front panel 54 of the cargo bed 9 is located in the non-expanded position A2 immediately behind the backrest 32. The screen shield 10 is located in the position partitioning the cargo bed 9 and the rear portion riding space P1 behind the backrest 32 of the rear seat 22.

When the 4 passengers transformation is changed to the 2 passengers transformation, the backrest 32 of the rear seat 22 is rotated in a front direction about the hinge 45 and is then overlapped with the surface of the seat bottom 31. The seat bottom 31 and the backrest 32 are then rotated in a front direction about the hinge 41 together with the supporting base 40 and, as shown in FIG. 3, are retracted in a substantially upright state in the space immediately behind the front seat 21.

The pin 60 is pulled out from the positioning hole 63 in the non-expanded position A2 of FIG. 5. The front panel 54 and the right or left expandable side panel 55 are slid in a front direction on the upper surface of the expandable bottom plate 56 and are then located in the expanded position A1 indicated by the solid line in FIG. 5. The pin 60 is then inserted into the positioning hole 63 in the expanded position A1, thereby the front panel 54 and the right or left expandable side panel 55 are fixed in the expanded position A1.

The screen shield 10 is fixed onto the front panel 54. The front panel 54 and the right or left expandable side panel 55 are moved to automatically move the screen shield 10 from the non-expanded position A2 to the expanded position A1. Unlike the conventional operation, it is unnecessary to singly lift and move the screen shield 10. The expanding operation of the cargo bed 9 and the moving operation of the screen shield 10 can be easily performed even by one operator.

When the 2 passengers transformation shown in FIG. 3 is changed to the 4 passengers transformation shown in FIG. 2 and the cargo bed 9 is contracted into a non-expanded state, the expanding operation may be reversed. Also in this case, the screen shield 10 is fixed onto the front panel 54, and it is unnecessary to singly lift and move the screen shield 10. Therefore, the contracting operation of the cargo bed 9 and the moving operation of the screen shield 10 can be easily performed even by one operator.

Second Embodiment

Figure 7:
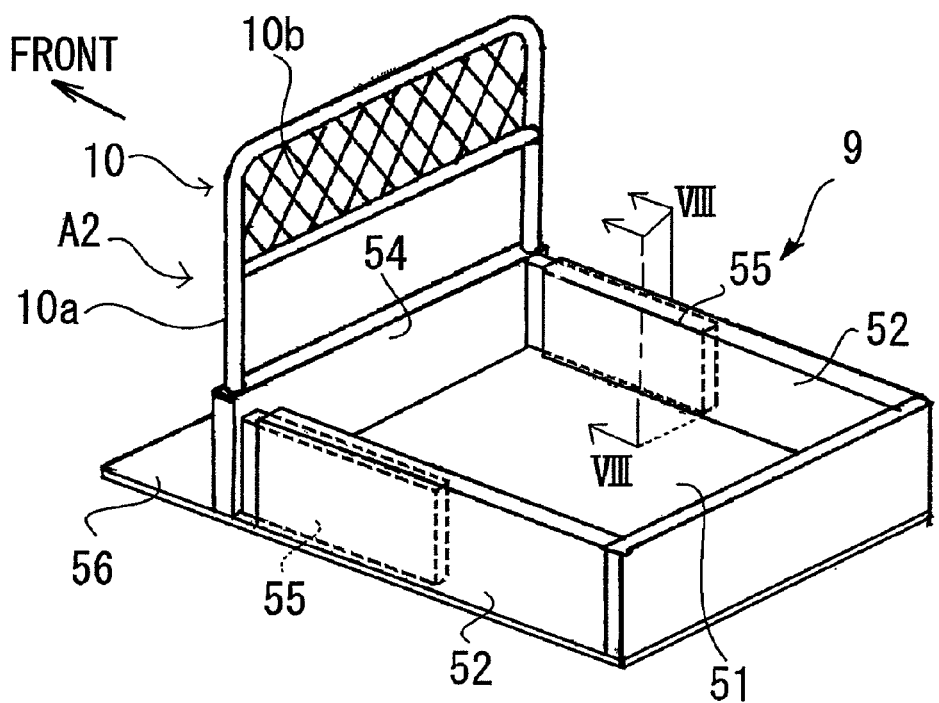
FIG. 7 is a perspective view of a cargo bed of a pick-up style utility vehicle according to a second embodiment of the present invention.
Figure 8:
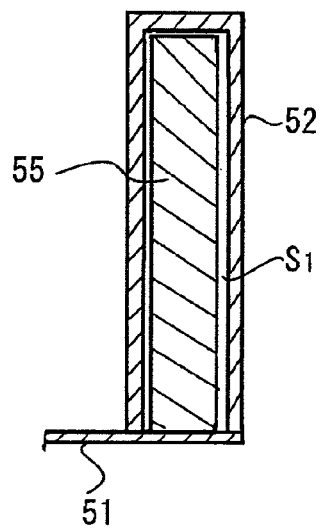
FIG. 8 is an enlarged sectional view taken along line VIII-VIII of FIG. 7.

FIGS. 7 and 8 show a second embodiment of the present invention, where FIG. 7 is a perspective view of the expandable cargo bed 9 and the screen shield 10 and FIG. 8 is an enlarged sectional view taken along line VIII-VIII of FIG. 7. The second embodiment has the same configuration as that of the first embodiment except that the following configuration (a) is different. Like components are indicated by like reference numerals.

(a) As shown in FIG. 8, the stationary side panel 52 has a hollow portion S1 having a shape and size which can house the expandable side panel 55, and the expandable side panel 55 is housed in the hollow portion S1.

Features of the second embodiment will be briefly described. In FIG. 7, the front panel 54 of the cargo bed 9 is integrally formed with or fixed onto the right and left expandable side panels 55. The screen shield 10 is fixed onto the front panel 54. The front panel 54 and the expandable side panels 55 can be integrally slid on the upper surfaces of the stationary bottom plate 51 and the expandable bottom plate 56 in a front or rear direction.

As described above, the stationary side panel 52 has the hollow portion S1 having a shape and size which can house the expandable side panel 55. When the expandable side panel 55 is located in the non-expanded position A2, as shown in FIG. 7, the expandable side panel 55 is housed in the hollow portion S1 of the stationary side panel 52.

According to this embodiment, the expandable side panel 55 is housed in the stationary side panel 52 in the non-expanded position A2. The appearance can be improved. Thus, the expandable side panel 55 can be supported by high supporting rigidity.

Third Embodiment

Figure 9:
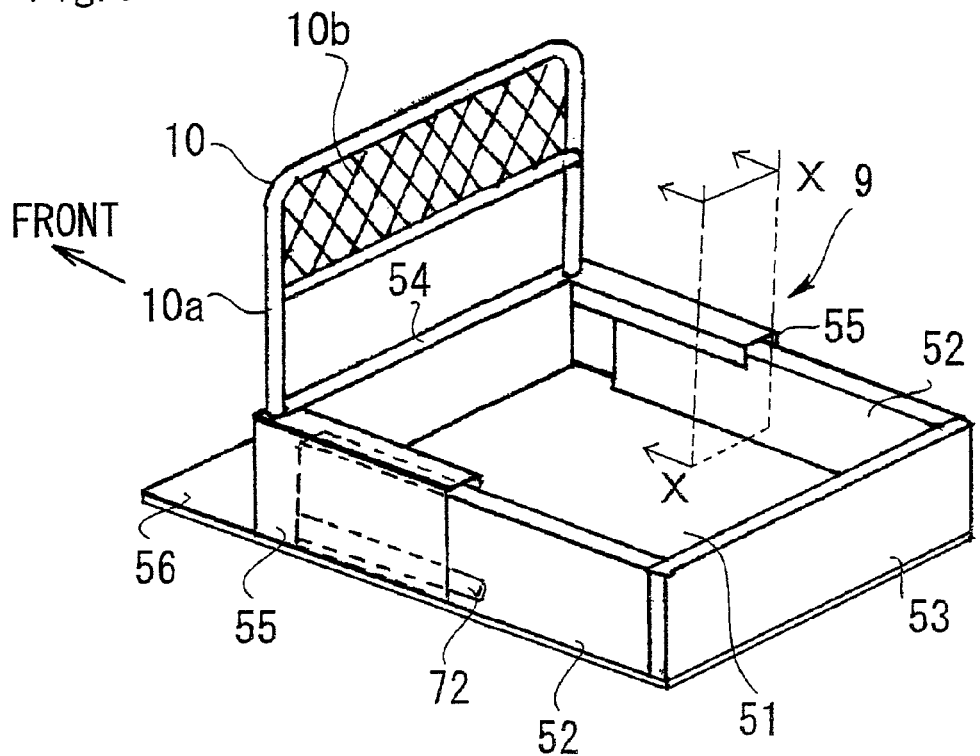
FIG. 9 is a perspective view of a cargo bed of a pick-up style utility vehicle according to a third embodiment of the present invention.
Figure 10:
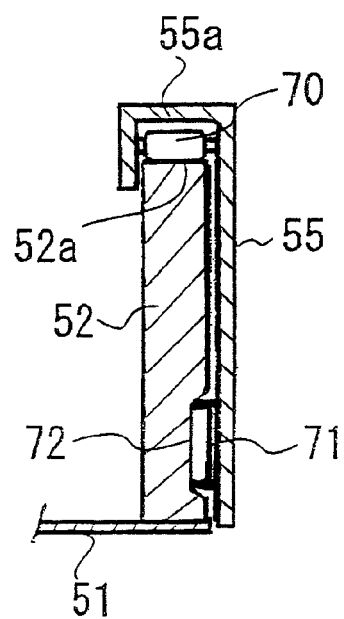
FIG. 10 is an enlarged sectional view taken along line X-X of FIG. 9.

FIGS. 9 and 10 show a third embodiment of the present invention, where FIG. 9 is a perspective view of the expandable cargo bed 9 and the screen shield 10, and FIG. 10 is an enlarged sectional view taken along line X-X of FIG. 9. The third embodiment has the same configuration as that of the first embodiment except that the following configuration (a) is different. Like components are indicated by like reference numerals.

(a) In FIG. 10, the expandable side panel 55 is arranged on the outer side of the stationary side panel 52 in a vehicle width direction and is supported by the upper end face and the outer side surface of the stationary side panel 52 so as to be slidable via rollers 70 and 71 in a front or rear direction.

Features of the third embodiment will be described in detail. An upper panel 55a facing an upper end face 52a of the stationary side panel 52 from above is integrally formed with the upper end of the expandable side panel 55. The roller 70 abutting the upper end face 52a of the stationary side panel 52 is rotatably supported. The roller 71 is rotatably supported by the surface of the expandable side panel 55 facing the outer side surface of the stationary side panel 52. The roller 71 abuts a recessed guide portion 72 formed in the outer side surface of the stationary side panel 52.

According to the third embodiment, it is unnecessary to singly move the screen shield 10 in the expanding and contracting operations of the cargo bed 9. Therefore, the changing operation of the cargo bed 9 becomes easy, and the expandable side panel 55 is moved via the rollers 70 and 71 in a front or rear direction. Thus, the screen shield 10, the front panel 54, and the expandable side panel 55 can be moved by a small force.

Fourth Embodiment

Figure 11:
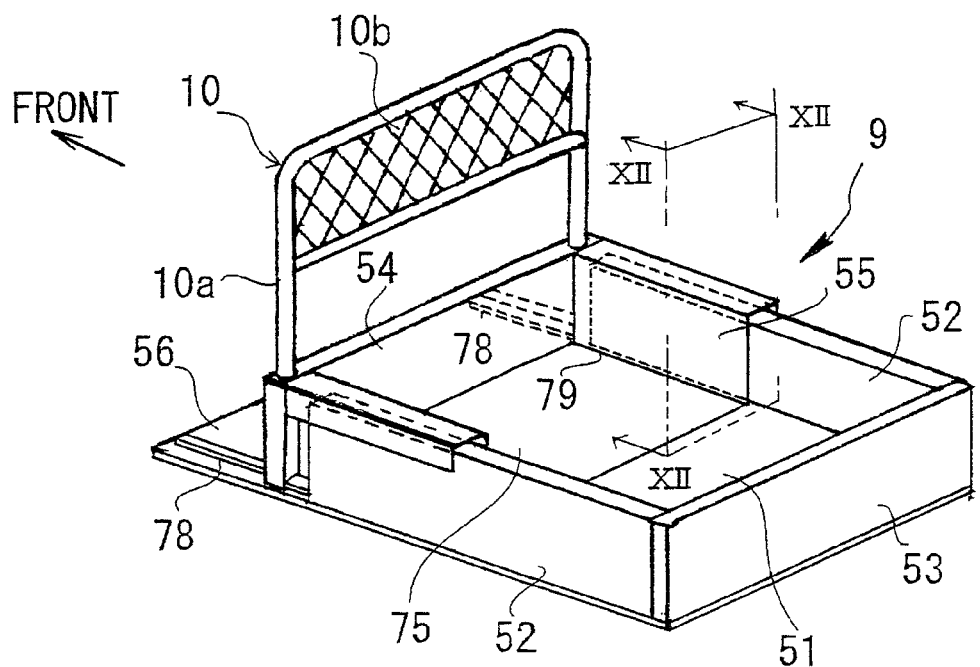
FIG. 11 is a perspective view of a cargo bed of a pick-up style utility vehicle according to a fourth embodiment of the present invention.
Figure 12:
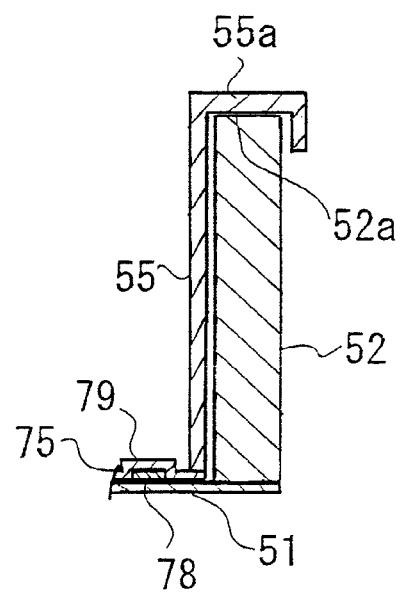
FIG. 12 is an enlarged sectional view taken along line XII-XII of FIG. 11.

FIGS. 11 and 12 show a fourth embodiment of the present invention, where FIG. 11 is a perspective view of the expandable cargo bed 9 and the screen shield 10, and FIG. 12 is an enlarged sectional view taken along line XII-XII of FIG. 11. The fourth embodiment has the same configuration as that of the first embodiment except that the following configurations (a) and (b) are different. Like components are indicated by like reference numerals.

(a) As shown in FIG. 11, in addition to the expandable bottom plate 56 integrally formed with the stationary bottom plate 51, a movable expandable bottom plate 75 coupling the lower end faces of the front panel 54 and the right or left expandable side panel 55 is provided.

(b) A pair of rails 78 extended in a front or rear direction is laid at the right and left end of the upper end of the expandable bottom plate 56. Each of the rails 78 engages each of recess portions (slide portions) 79 provided in the movable expandable bottom plate 75 so as to be slidable in a front or rear direction. The L-shaped upper panel 55a facing the upper end face 52a of the stationary side panel 52 from above is formed at the upper end of the expandable side panel 55.

According to the fourth embodiment, it is unnecessary to singly move the screen shield 10 in the expanding and contracting operations of the cargo bed 9. Therefore, the changing operation of the cargo bed 9 becomes easy, and the front panel 54, the expandable side panel 55, and the movable expandable bottom plate 75 cannot be rattled in a right or left direction during movement in a front or rear direction by the guide operation of the rail 78 and the recess portion 79 and the guide operations of the L-shaped upper panel 55a of the expandable side panel 55.

Fifth Embodiment

Figure 13:
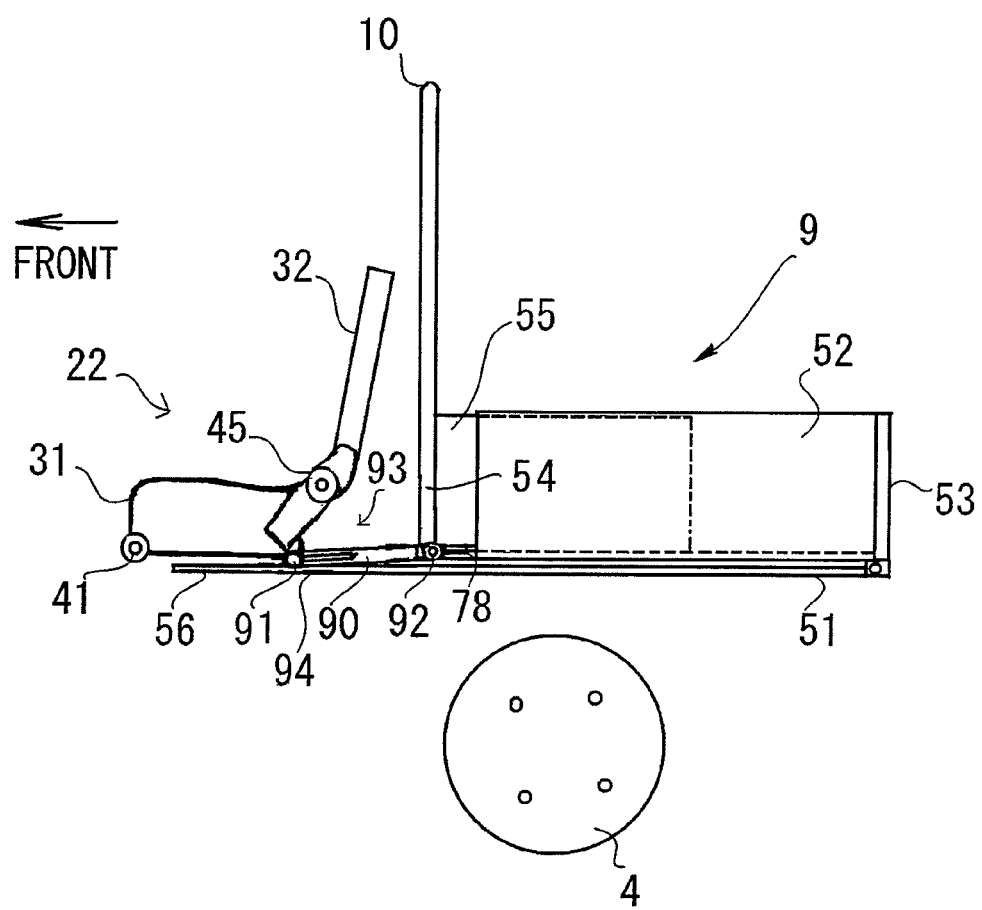
FIG. 13 is a left side view of a cargo bed of a pick-up style utility vehicle according to a fifth embodiment of the present invention when the cargo bed is not expanded.
Figure 14:
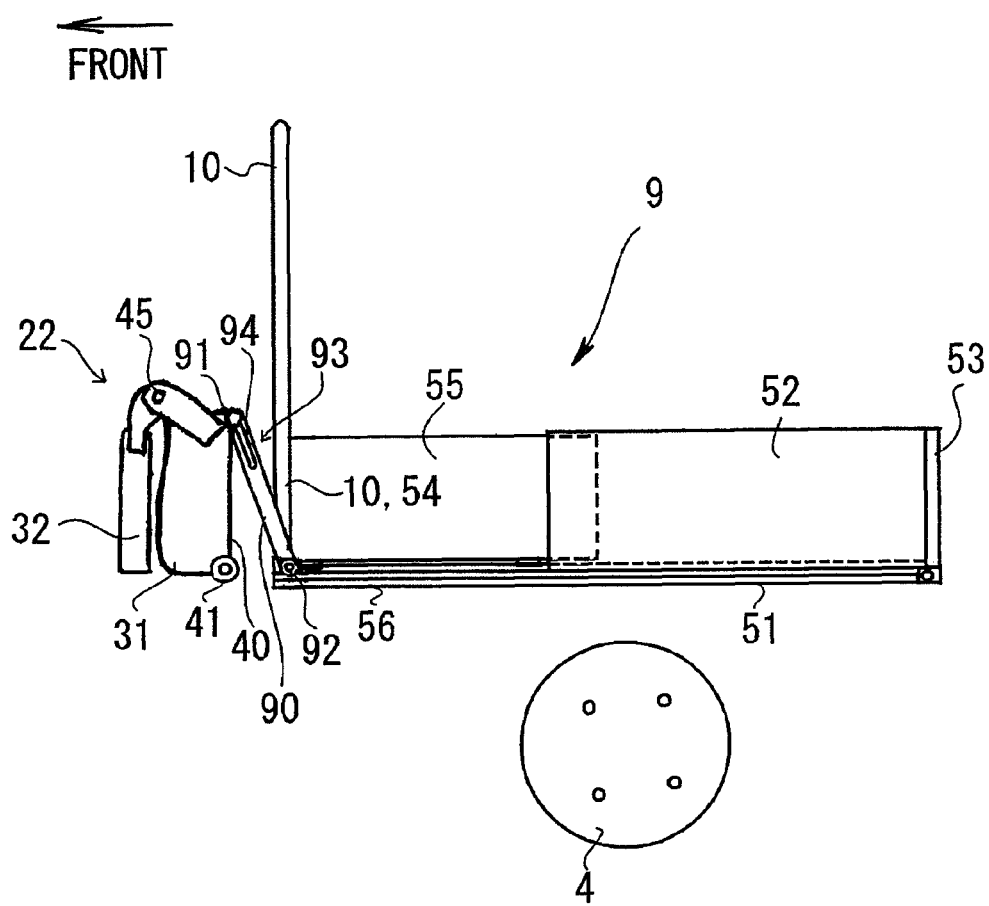
FIG. 14 is a left side view of the cargo bed of FIG. 13 when the cargo bed is expanded.
Figure 15:
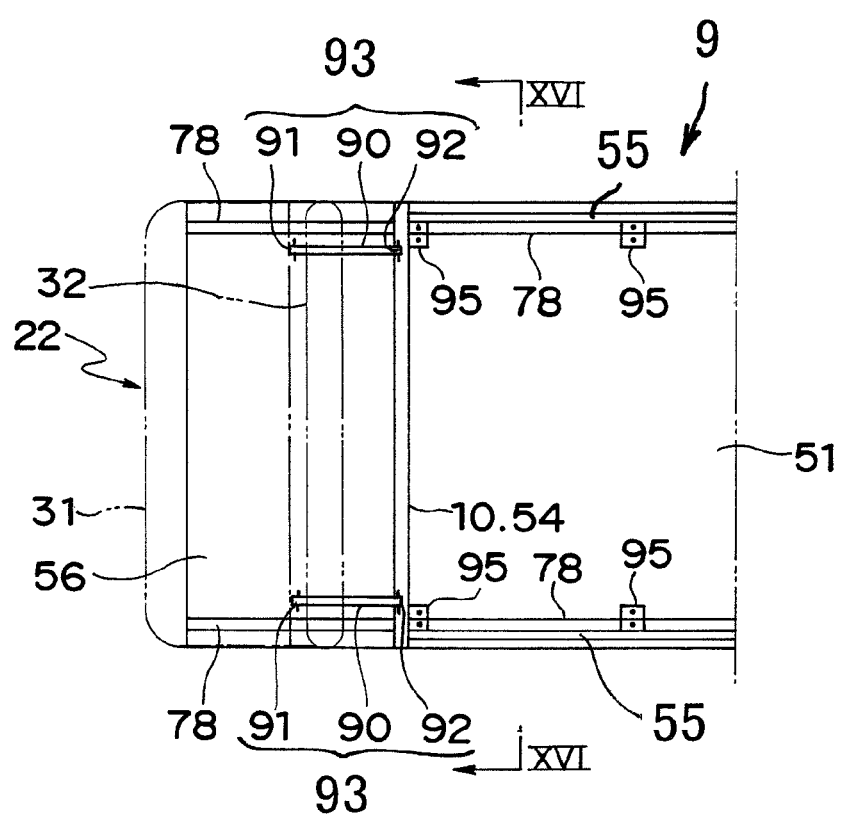
FIG. 15 is a plan view of the cargo bed of FIG. 13 when the cargo bed is in a non-expanded state.
Figure 16:
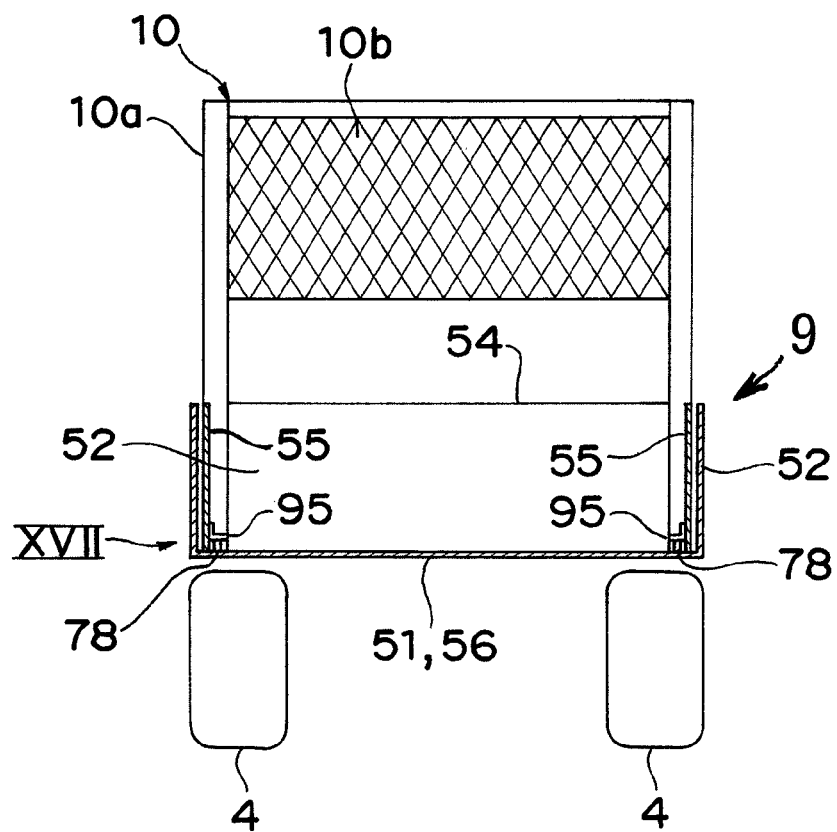
FIG. 16 is a cross-sectional view taken along line XVI-XVI of FIG. 15.
Figure 17:
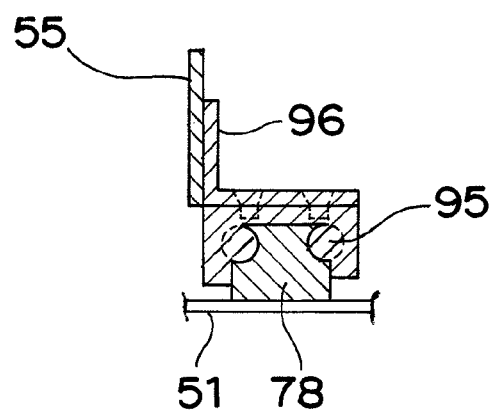
FIG. 17 is an enlarged sectional view of an arrow XVII portion of FIG. 16.

FIGS. 13 to 17 show a fifth embodiment of the present invention, where FIG. 13 is a left side view of the expandable cargo bed 9, the screen shield 10, and the rear seat 22 in the 4 passengers transformation, FIG. 14 is a left side view of the expandable cargo bed 9, the screen shield 10, and the rear seat 22 in the 2 passengers transformation, FIG. 15 is a plan view of the expandable cargo bed 9 in the 4 passengers transformation, FIG. 16 is an enlarged sectional view taken along line XVI-XVI of FIG. 15, and FIG. 17 is an enlarged view of an arrow XVII portion of FIG. 16. The fifth embodiment has the same configuration as that of the first embodiment except that the following configurations (a) and (b) are different. Like components are indicated by like reference numerals.

(a) As shown in FIG. 15, the expandable side panel 55 is supported by the rail 78 provided on the upper surfaces of the stationary bottom plate 51 and the extendable bottom plate 56 and extended in a front or rear direction.

(b) As shown in FIGS. 13 and 14, the front panel 54 and the right or left expandable side panel 55 are coupled to the seat bottom 31 (or backrest 32) of the rear seat 22 via a link mechanism 93 having a link 90 and front and rear hinge pins 91 and 92.

The link mechanism 93 coupling the rear seat 22, the front panel 54, and the expandable side panel 55 and a slide mechanism of the right or left expandable side panel 55 will be described in detail.

In FIG. 13, the front end of the link 90 of the link mechanism 93 is rotatably coupled to the rear end of the seat bottom 31 (or the lower end of the backrest 32) via the front hinge pin 91. The rear end of the link 90 is rotatably coupled to the front lower end of the right or left expandable side panel 55 via the rear hinge pin 92. The front hinge pin 91 engages into an elongated hole 94 formed at the front end of the link 90.

In FIG. 15, four linear bearings 95 supported by each of the rails 78 so as to be movable in a front or rear direction are provided at the front and rear ends of each of the expandable side panels 55.

In FIG. 17, an L-shaped bracket 96 is fixed by welding at the lower end of the expandable side panel 55. The linear bearing 95 is fixed onto the lower surface of the L-shaped bracket 96.

According to the fifth embodiment, since the rear seat 22 is folded and retracted, the cargo bed 9 is automatically expanded in a front direction via the link mechanism 93. In addition, the cargo bed 9 is automatically contracted in a rear direction by bringing the rear seat 22 into a used state.

Specifically, when the 4 passengers transformation of FIG. 13 is changed to the 2 passengers transformation of FIG. 14, the backrest 32 of the rear seat 22 of FIG. 13 is rotated in a front direction about the hinge 45, and is then overlapped with the surface of the seat bottom 31. The seat bottom 31 and the backrest 32 are rotated in a front direction about the hinge 41. With the rotation of the seat bottom 31 and the backrest 32, the front panel 54, the expandable side panel 55, and the screen shield 10 are pulled out in a front direction via the hinge pins 91 and 92 and the link 90 and are then brought into the expanded state, as shown in FIG. 14.

According to the fifth embodiment, the retracting operation of the rear seat 22 is performed so that the cargo bed 9 is automatically expanded into the expanded state and the screen shield 10 is moved from the non-expanded position A2 to the expanded position A1. Therefore, the operability of the changing operation of the cargo bed 9 can be improved.

Sixth Embodiment

Figure 18:
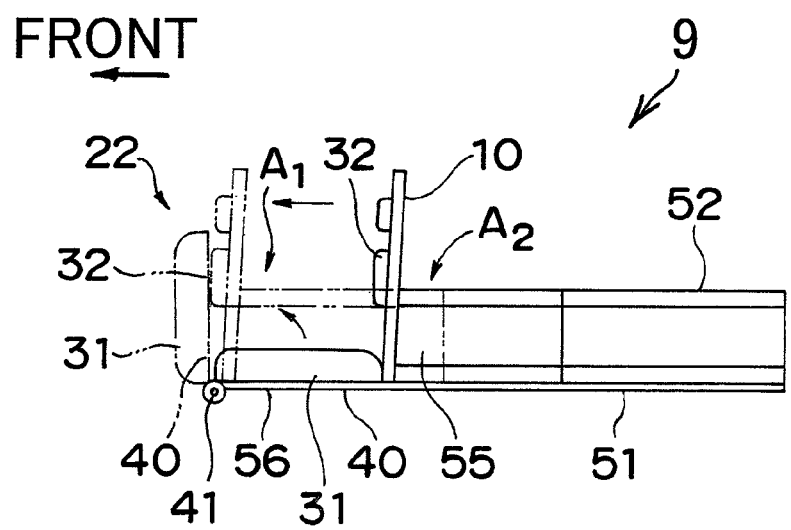
FIG. 18 is a left side view of a cargo bed of a pick-up style utility vehicle according to a sixth embodiment of the present invention.
Figure 19:
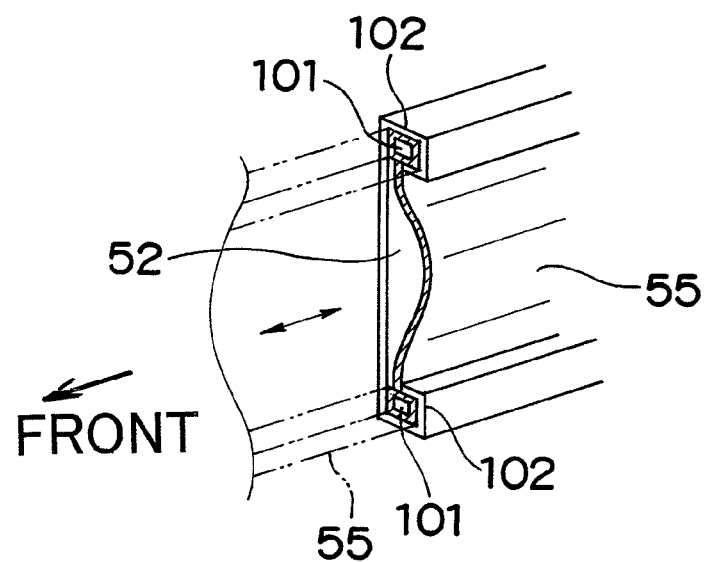
FIG. 19 is a perspective view of a front end of a stationary side panel of FIG. 18.

FIGS. 18 and 19 show a sixth embodiment of the present invention, where FIG. 18 is a left side view of the expandable cargo bed 9, the screen shield 10, and the rear seat 22 in the 4 passengers transformation, and FIG. 19 is an enlarged perspective view of the fitting portion of the front end of the stationary side panel 52 and the expandable side panel 55. The sixth embodiment has the same configuration as that of the first embodiment except that the following configurations (a) and (b) are different. Like components are indicated by like reference numerals.

(a) As shown in FIG. 19, a slider portion 101 of rectangular cross section is formed at the upper or lower end of the expandable side panel 55. The slider portion 101 is fitted into a guide groove 102 formed at the upper or lower end of the stationary side panel 52 so as to be movable in a front or rear direction.

(b) As shown in FIG. 18, the backrest 32 of the rear seat 22 is fixed onto the front surface of the screen shield 10.

In FIG. 18, the front end of the seat bottom 31 of the rear seat 22 is rotatably supported at the front end of the expandable bottom plate 56 via the hinge 41.

According to the sixth embodiment, when the cargo bed 9 is changed from the non-expanded state indicated by the solid line of FIG. 18 to the expanded state indicated by the imaginary line thereof, the seat bottom 31 is rotated in a front direction about the hinge 41 and is then retracted in a substantially upright state.

The front panel 54 (not shown) and the right or left expandable side panel 55 in the non-expanded position A2 are slid in a front direction to the expanded position A1 on the upper surface of the expandable bottom plate 56. With this operation, the screen shield 10 is automatically moved from the non-expanded position A2 to the expanded position A1. In the expanded position A1, the backrest 32 abuts the rear surface of the seat bottom 31 in a substantially upright state.

Seventh Embodiment

Figure 20:
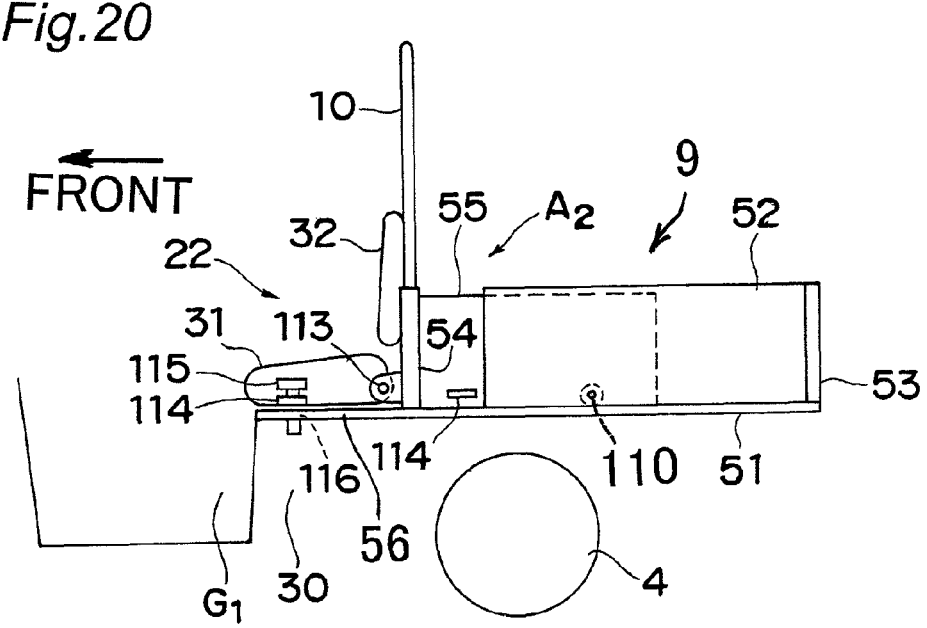
FIG. 20 is a left side view of a cargo bed of a pick-up style utility vehicle according to a seventh embodiment of the present invention when the cargo bed is not expanded.
Figure 21:
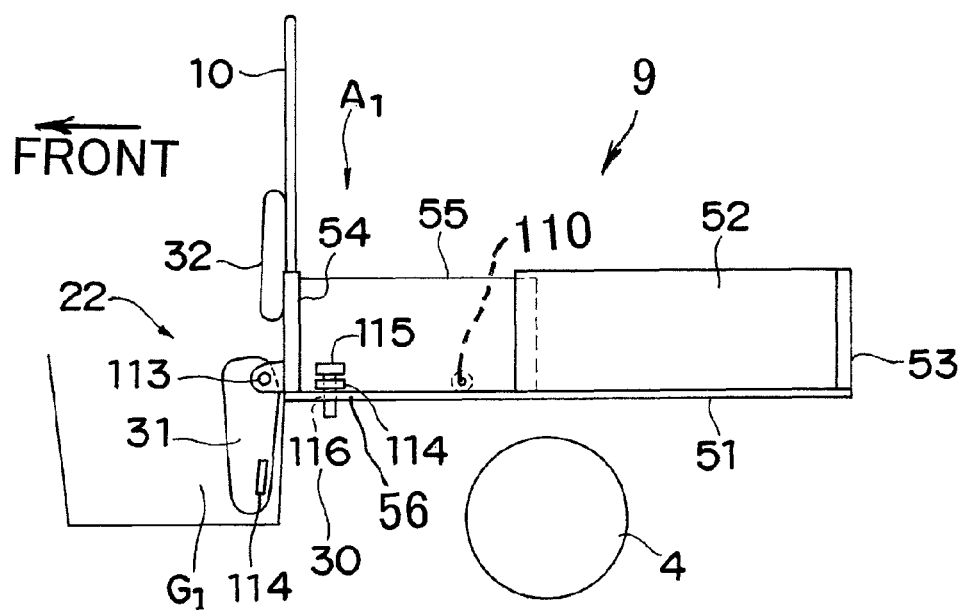
FIG. 21 is a left side view of the cargo bed of the pick-up style utility vehicle of FIG. 20 when the cargo bed is in an expanded state.
Figure 22:
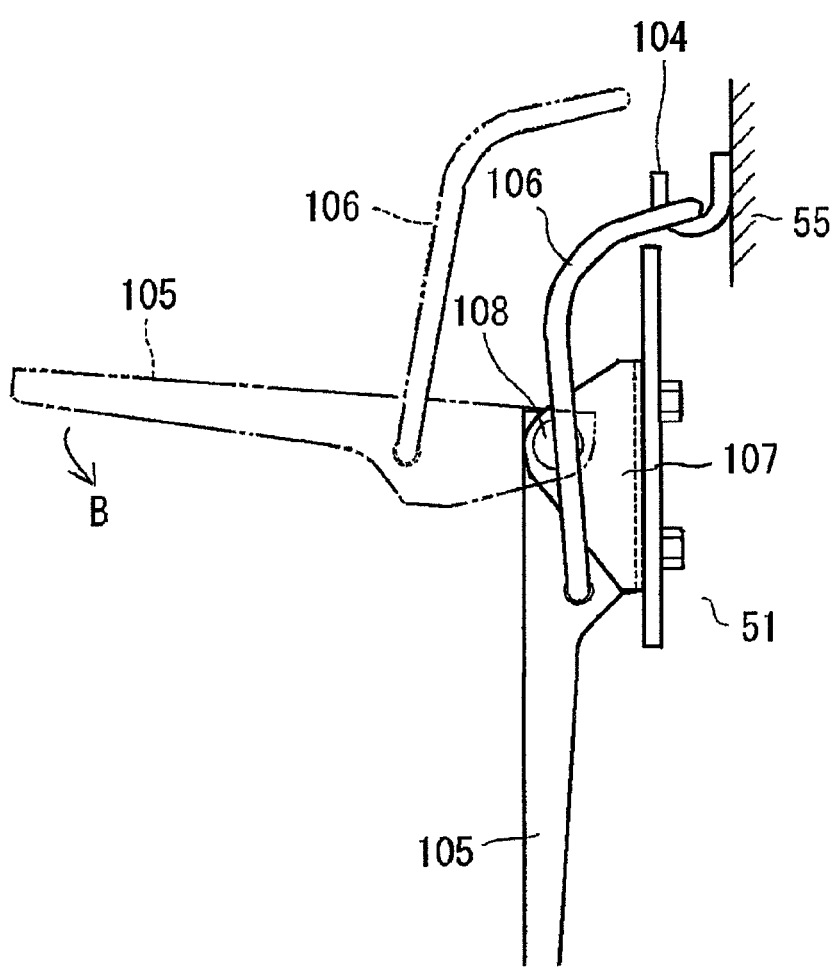
FIG. 22 is a rear view showing an example of a lock mechanism of the cargo bed of FIG. 20.

FIGS. 20 to 22 show a seventh embodiment of the present invention, where FIG. 20 is a left side view of the expandable cargo bed 9, the screen shield 10, and the rear seat 22 in the 4 passengers transformation, FIG. 21 is a left side view of the expandable cargo bed 9, the screen shield 10, and the rear seat 22 in the 2 passengers transformation, and FIG. 22 is a rear view showing an example of a fixing mechanism.

The seventh embodiment has the same configuration as that of the first embodiment except that the following configurations (a), (b), (c), and (d) are different. Like components are indicated by like reference numerals.

(a) In FIG. 21, the expandable side panel 55 is supported by the stationary bottom plate 51 and the expandable bottom plate 56 so as to be movable via a roller 110 in a front or rear direction.

(b) The backrest 32 of the rear seat 22 is fixed onto the front surface of the screen shield 10.

(c) The rear end of the seat bottom 31 of the rear seat 22 is rotatably coupled to the front end of the front panel 54 via a hinge pin 113 and, as shown in FIG. 21, is retracted in front of the engine housing box 30 (a rear portion leg space G1).

(d) As the fixing mechanism of the front panel 54 and the seat bottom 31 in the non-expanded state, a lock section 114 having a pin insertion hole is provided in the seat bottom 31 of the rear seat 22 and the outer side surface at the front end of the expandable side panel 55. A positioning hole 116 is formed in the front end of the expandable bottom plate 56.

When the 4 passengers transformation of FIG. 20 is changed to the 2 passengers transformation of FIG. 21, in FIG. 20, a lock pin 115 inserted into the lock section 114 of the seat bottom 31 of the rear seat 22 is pulled out to integrally move the seat bottom 31, the front panel 54, the right or left expandable side panel 55, and the screen shield 10 in a front direction. With the movement in a front direction, the seat bottom 31 is dropped in a downward direction along the front surface of the box 30 and is then retracted in the rear portion leg space G1.

After the movement, in FIG. 21, the front panel 54 and the expandable side panel 55 shifted to the expanded position A1 are fixed in the expanded position A1 by inserting the lock pin 115 into the pin insertion hole of the lock section 114 provided at the front end of the expandable side panel 55 and the positioning hole 116.

FIG. 22 shows a modification example of the fixing mechanism of the expandable side panel 55 and the front panel 54, which has a latch mechanism of a fulcrum-crossing type having a hook 104, a lever 105, and a ring 106. A bracket for lever support 107 is provided on the stationary bottom plate 51 (or on the vehicle body side). The lever 105 is rotatably supported by the bracket 107 via a pin 108. The ring 106 is rotatably coupled in the position urged from the pin 108 midway of the lever 105. The hook 104 is provided on the side surface of the expandable side panel 55 and the side surface of the seat bottom (not shown) of the rear seat 22.

In the latch mechanism, the ring 106 is hooked onto the hook 104 to rotate the lever in an arrow B direction, thereby pulling the ring 106 in a downward direction. When the ring 106 crosses the axis of the pin 108, the reaction force from the hook 104 is changed to the force urging the lever 105 in the arrow B direction for locking.

Eighth Embodiment

Figure 23:
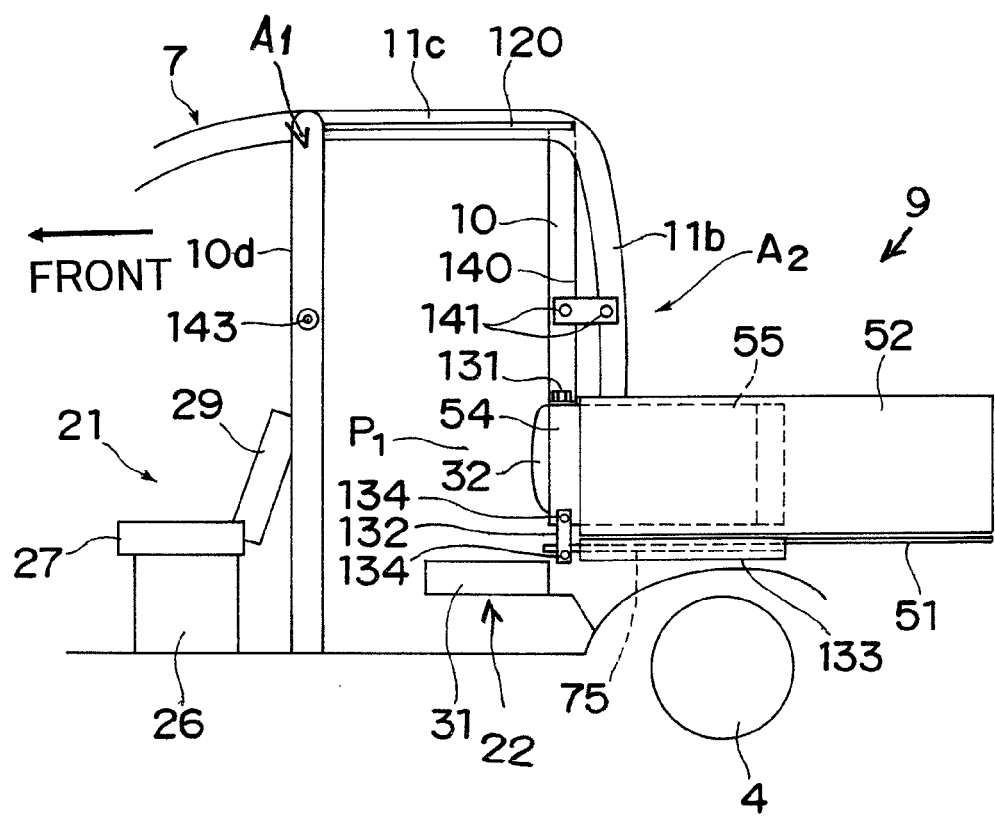
FIG. 23 is a left side view of a cargo bed of a pick-up style utility vehicle according to an eighth embodiment of the present invention when the cargo bed is not expanded.
Figure 24:
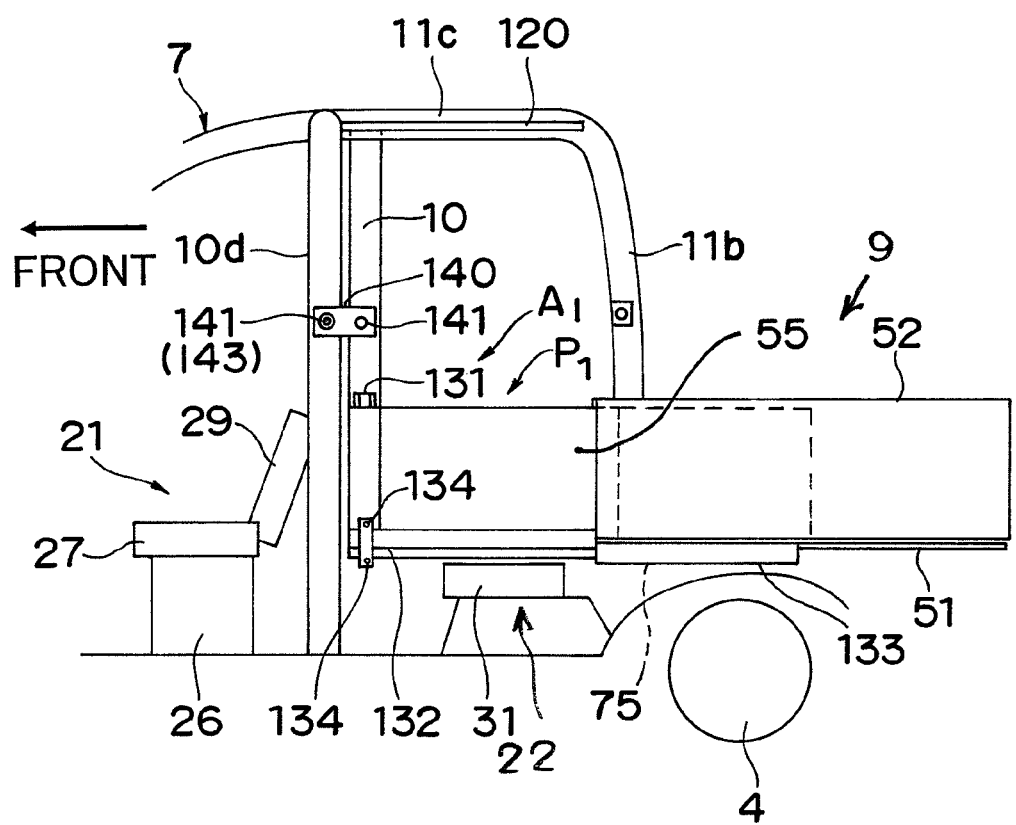
FIG. 24 is a left side view of the cargo bed of the pick-up style utility vehicle of FIG. 23 when the cargo bed is expanded.
Figure 25:
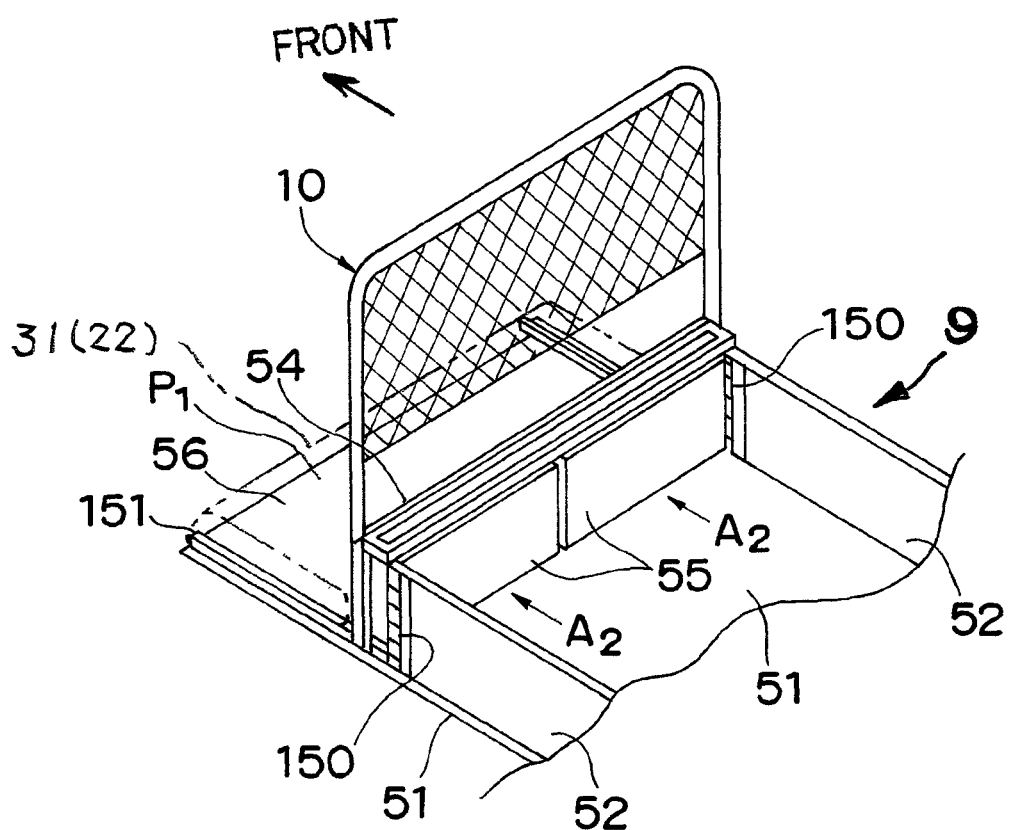
FIG. 25 is a perspective view of a cargo bed of a pick-up style utility vehicle according to a ninth embodiment of the present invention when the cargo bed is not expanded.

FIGS. 23 to 25 show an eighth embodiment of the present invention, where FIG. 23 is a left side view of the expandable cargo bed 9, the screen shield 10, and the rear seat 22 in the 4 passengers transformation, and FIG. 24 is a left side view of the expandable cargo bed 9, the screen shield 10, and the rear seat 22 in the 2 passengers transformation.

The eighth embodiment has the same configuration as that of the first embodiment except that the following configurations (a), (b), (c), (d), and (e) are different. Like components are indicated by like reference numerals.

(a) In FIG. 23, the upper end of the screen shield 10 is supported by a pair of rails 120 provided in the upper side portions 11c of the cabin frame 7 and extended in a front or rear direction so as to be movable in a front or rear direction.

(b) In FIG. 23, the screen shield 10 is detachably fixed onto the upper surface at the front end of the expandable side panel 55 by a bolt 131. The screen shield 10 is integrally formed with the front panel 54.

(c) In FIG. 23, the backrest 32 of the rear seat 22 is provided on the front panel 54 of the cargo bed 9.

(d) In FIG. 23, the movable expandable bottom plate 75 separate from the stationary bottom plate 51 is provided and the expandable bottom plate 56 integral with the stationary bottom plate 51 described in FIG. 4 is not provided. The movable expandable bottom plate 75 is formed so as to be separate from the expandable side panel 55 and the front panel 54 and is independently moved in a front or rear direction. The movable expandable bottom plate 75 can be retracted in a housing box 133 provided on the lower surface of the stationary bottom plate 51.

(e) The seat bottom 31 of the rear seat 22 is fixed so as to be lower than the stationary bottom plate 51 and the movable expandable bottom plate 75.

In the 4 passengers transformation shown in FIG. 23, the movable expandable bottom plate 75 is retracted in the housing box 133. The front end of the movable expandable bottom plate 75 is coupled to the front lower end of the expandable side panel 55 by a coupling plate 132 and bolts 134. The screen shield 10 is fixed onto the upper surface at the front end of the expandable side panel 55 by the bolt 131, and is fixed onto the rear side portion 11b of the cabin frame 7 by a coupling plate 140 and bolts 141. In addition, a female screw portion 143 for fixing the screen shield 10 in the expanded position A1 is provided in an intermediate longitudinal portion 10d of the cabin frame 7.

When the 4 passengers transformation shown in FIG. 23 is changed to the 2 passengers transformation shown in FIG. 24, the coupling plate 132 is detached to pull out only the movable expandable bottom plate 75 from the housing box 133 in a front direction. The upper surface of the seat bottom 31 of the rear seat 22 is covered by the movable expandable bottom plate 75.

The screen shield 10 is detached from the rear side portion 11b of the cabin frame 7 to integrally move the expandable side panel 55, the front panel 54, and the screen shield 10 in a front direction. In this manner, the screen shield 10 need not be moved singly. Since the upper end of the screen shield 10 is supported by the rail 120, the flexing of the screen shield 10 can be prevented during the movement. The screen shield 10 can also be moved by a small operation force.

When the operation is performed by a smaller operation force, the bolt 131 is removed to detach the screen shield 10 from the expandable side panel 55. Thus, the screen shield 10 can be moved singly in a front direction.

In the 2 passengers transformation shown in FIG. 24, the screen shield 10 in the expanded position A1 is fixed into the female screw portion 143 of the intermediate longitudinal member 11d of the cabin frame 7 using the coupling plate 140 and the bolt 141. The movable expandable bottom plate 75 and the expandable side panel 55 are coupled by the coupling plate 132 and the bolts 134.

In the expanded state of the cargo bed, the screen shield 10 can be fixed onto the rear surface of the backrest 29 of the front seat 21 by the coupling plate.

When the 2 passengers transformation shown in FIG. 24 is changed to the 4 passengers transformation shown in FIG. 23, the expanding operation may be reversed.

Ninth Embodiment

Figure 26:
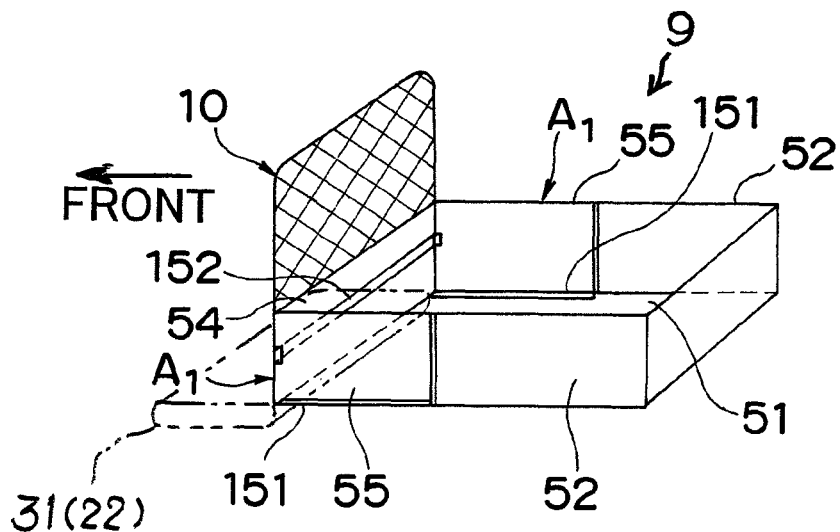
FIG. 26 is a perspective view of the cargo bed of the pick-up style utility vehicle of FIG. 25 when the cargo bed is expanded.
Figure 27:
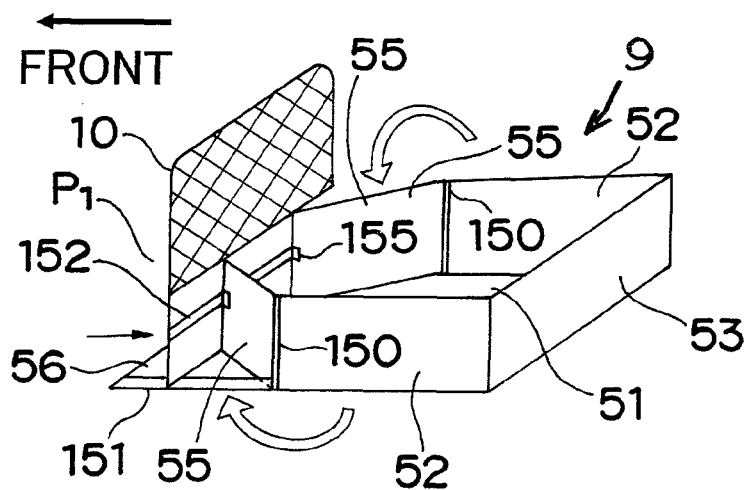
FIG. 27 is a perspective view of the cargo bed of the pick-up style utility vehicle of FIG. 25 when the cargo bed is being shifted.

FIGS. 25 to 27 show a ninth embodiment of the present invention, where FIG. 25 is a perspective view of the front portion of the expandable cargo bed 9 and the screen shield 10 in the 4 passengers transformation, FIG. 26 is a perspective view of the expandable cargo bed 9 and the screen shield 10 in the 2 passengers transformation, and FIG. 27 is a perspective view of the expandable cargo bed 9 and the screen shield 10 while the 2 passengers transformation is changed to the 4 passengers transformation.

The ninth embodiment has the same configuration as that of the first embodiment except that the following configurations (a), (b), and (c) are different. Like components are indicated by like reference numerals.

(a) In FIG. 27, the right or left expandable side panel 55 is rotatably supported by a vertical hinge 150 provided at the front end of each of the stationary side panels 52, and can be changed between the expanded position A1 where the expandable side panel 55 is extended in a front direction from the front end of the stationary side panel 52, as shown in FIG. 26, and the non-expanded position A2 (retracted position) where the expandable side panel 55 is extended to the inner side in a vehicle width direction from the front end of the stationary side panel 52, as shown in FIG. 25.

(b) In FIG. 25, the screen shield 10 is fixed onto the front panel 54 and is supported by a pair of rails 151 provided at the right and left end on the upper surface of the expandable bottom plate 56 so as to be movable in a front or rear direction.

(c) In FIG. 27, a rail 152 extended horizontally in a right or left direction is laid on the rear surface of the front panel 54. A slider 155 provided at the front end of each of the expandable side panels 55 engages the rail 152 so as to be movable along the rail length.

When the 4 passengers transformation shown in FIG. 25 is changed to the 2 passengers transformation shown in FIG. 26 to expand the cargo bed 9, in FIG. 25, the right or left expandable side panel 55 is opened in a front direction about the hinge 150.

In FIG. 27, with the rotation of the expandable side panel 55 in a front direction, the front panel 54 and the screen shield 10 are pushed by the slider 155 at the front end of the expandable side panel 55 so as to be moved in a front direction on the rail 151.

In FIG. 26, when the expandable side panel 55 is opened to the expanded position A1, the front panel 54 and the screen shield 10 are also extended to the expanded position A1. In this state, although not shown, the expandable side panel 55, the front panel 54, and the screen shield 10 are fixed by each of the fixing mechanisms.

When the 2 passengers transformation shown in FIG. 26 is changed to the 4 passengers transformation shown in FIG. 25, the expanding operation may be reversed.

Note that, in this embodiment, in the 2 passengers transformation shown in FIG. 25, the seat bottom 31 of the rear seat 22 is mounted on the expandable bottom plate 56 and, in the 4 passengers transformation shown in FIG. 26, the seat bottom 31 of the rear seat 22 is rotated 180 degrees in a front direction via a hinge 31a. The rear surface of the seat bottom 31 of the rear seat 22 can be used as a portion of the bottom plate of the cargo bed 9.

Tenth Embodiment

Figure 28:
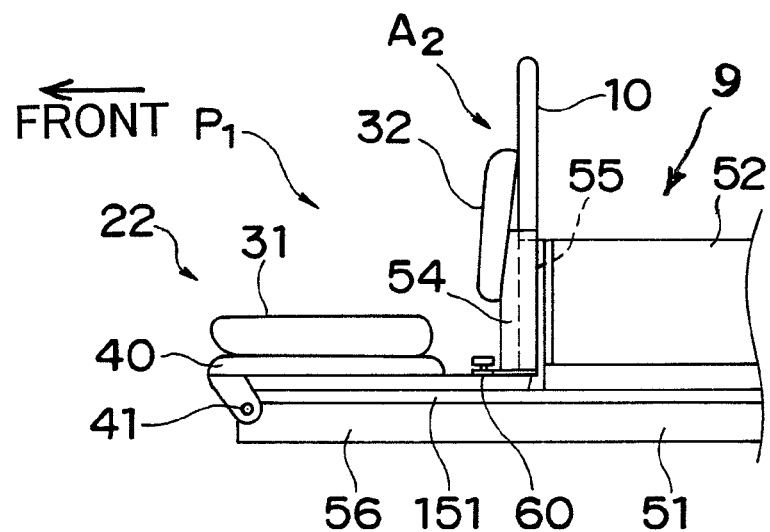
FIG. 28 is a left side view of a cargo bed and a rear seat of a pick-up style utility vehicle according to a tenth embodiment of the present invention when the cargo bed is not expanded.
Figure 29:
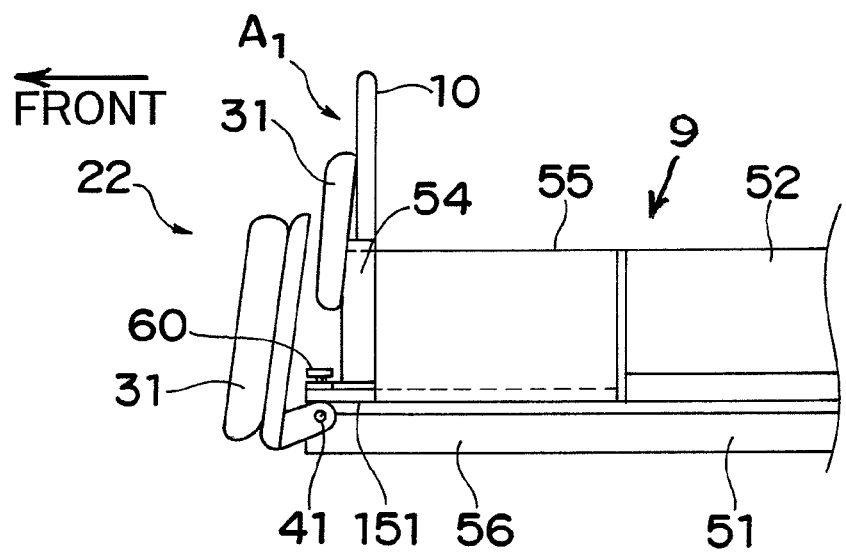
FIG. 29 is a left side view of the cargo bed and the rear seat of the pick-up style utility vehicle of FIG. 28 when the cargo bed is in the expanded state.
Figure 30:
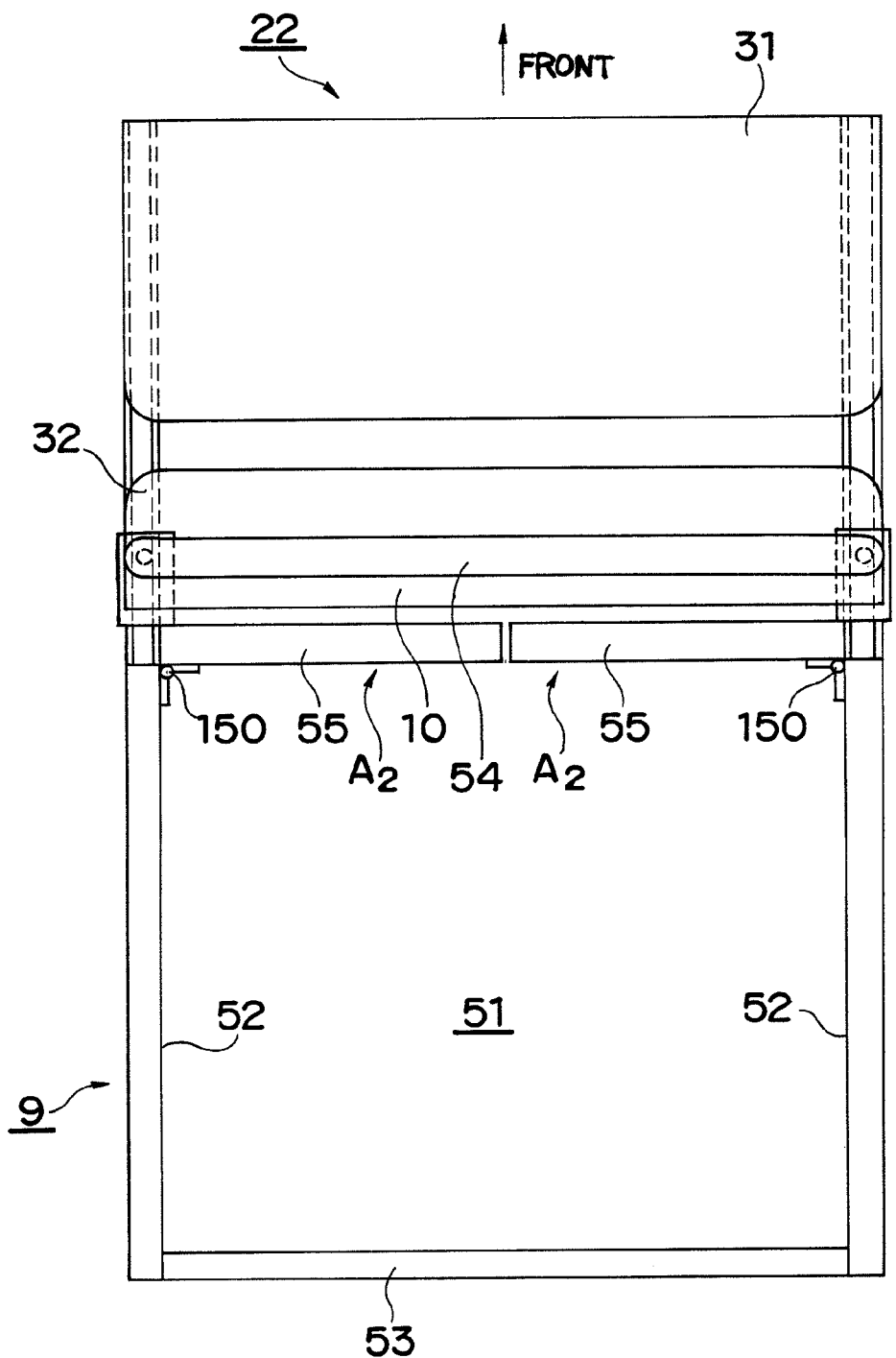
FIG. 30 is a plan view of FIG. 28.

FIGS. 28 to 30 show a tenth embodiment of the present invention, where FIG. 28 is a left side view of the front portion of the expandable cargo bed 9, the screen shield 10, and the rear seat 22 in the 4 passengers transformation, FIG. 29 is a left side view of the front portion of the expandable cargo bed 9, the screen shield 10, and the rear seat 22 in the 2 passengers transformation, and FIG. 30 is a plan view of FIG. 28.

The tenth embodiment has the same configuration as that of the first embodiment except that the following configurations (a), (b), and (c) are different. Like components are indicated by like reference numerals.

(a) In FIG. 30, as in the ninth embodiment, the right or left expandable side panel 55 is rotatably supported by the vertical hinge 150 provided at the front end of each of the stationary side panels 52, and can be changed between the expanded position A1 where the expandable side panel 55 is extended in a front direction from the front end of the stationary side panel 52 (FIG. 29) and the non-expanded position A2 where the expandable side panel 55 is extended to the inner side in a vehicle width direction from the front end of the stationary side panel 52 (FIG. 28).

(b) In FIG. 28, as in the ninth embodiment, the screen shield 10 is integrally formed with the front panel 54. As shown in FIG. 30, the front panel 54 and the screen shield 10 are supported by the rails 151 provided at the right and left ends of the upper surface of the expandable bottom plate 56 so as to be movable in a front or rear direction.

When the 4 passengers transformation shown in FIGS. 28 and 30 is changed to the 2 passengers transformation shown in FIG. 29 to expand the cargo bed, in FIG. 28, the pin 60 fixing the front panel 54 is pulled out to open the right or left expandable side panel 55 of FIG. 30 in a front direction about the hinge 150. With the rotation of the expandable side panel 55 in a front direction, the front panel 54 and the screen shield 10 are pushed by the front end of the expandable side panel 55 and is then moved on the rails 151 in a front direction.

In FIG. 29, when the expandable side panel 55 is opened to the expanded position A1, the front panel 54 and the screen shield 10 are also extended to the expanded position A1. In this state, the front panel 54 is fixed at the front end of the expandable bottom plate 56 by the pin 60.

When the 2 passengers transformation shown in FIG. 29 is changed to the 4 passengers transformation shown in FIGS. 28 and 30, the pin 60 is pulled out to release the fixed state of the front panel 54, thereafter, the front panel 54 is slid in a rear direction. With the movement of the front panel 54 in a rear direction, the front end of the right or left expandable side panel 55 is pushed in a rear direction and is then automatically moved to the non-expanded position A2 shown in FIG. 30.

Other Embodiments (1) The fixing mechanism fixing the expandable side panel, the front panel, and the screen shield of the cargo bed in the non-expanded position or the expanded position is not limited to the pin type, as shown in FIGS. 5 and 6, the latch mechanism of a fulcrum-crossing type, as shown in FIG. 22, and the bolt type using the bolt and the coupling plate, as shown in FIG. 23. A clamp type, a magnet type, and various fixing means can also be used.

(2) The present invention is not limited to the configurations of the embodiments described above and includes various modification examples contemplated in the scope without departing from the contents described in the scope of the claims.

What is claimed is:

1. A pick-up style utility vehicle comprising:
a front seat
a rear seat and
a cargo bed in this order from a front of the vehicle; and
a screen shield partitioning the cargo bed and a riding space in front of the cargo bed, wherein:
the cargo bed has at least a stationary bottom plate, right and left stationary side panels, a front panel movable into the riding space, expandable side panels expandable into the riding space, and an expandable bottom plate expanded into the riding space,
the cargo bed is changeable between an expanded state in which the cargo bed is expanded in a front direction into the riding space, and a non-expanded state not occupying the riding space,
each of the expandable side panels and the screen shield or the expandable bottom plate and the screen shield are supported by a vehicle body configuring portion so as to be integrally shiftable between an expanded position and a non-expanded position,
each of the expandable side panels is supported by the vehicle body configuring member so as to slide in a front or rear direction, and the screen shield is fixed at or integrally provided with a front end of the expandable side panel,
the vehicle body configuring member is the stationary side panel, and
the expandable side panel is located on an outer side of the stationary side panel in a vehicle width direction when the cargo bed is not expanded.

2. A pick-up style utility vehicle comprising:
a front seat
a rear seat and
a cargo bed in this order from a front of the vehicle; and
a screen shield partitioning the cargo bed and a riding space in front of the cargo bed, wherein:
the cargo bed has at least a stationary bottom plate, right and left stationary side panels, a front panel movable into the riding space, expandable side panels expandable into the riding space, and an expandable bottom plate expanded into the riding space,
the cargo bed is changeable between an expanded state in which the cargo bed is expanded in a front direction into the riding space, and a non-expanded state not occupying the riding space,
each of the expandable side panels and the screen shield or the expandable bottom plate and the screen shield are supported by a vehicle body configuring portion so as to be integrally shiftable between an expanded position and a non-expanded position,
each of the expandable side panels is supported by the vehicle body configuring member so as to slide in a front or rear direction, wherein the screen shield is fixed at or integrally provided with a front end of the expandable side panel,
the vehicle body configuring member is the stationary side panel, and
the expandable side panel is refracted in the stationary side panel formed in a hollow shape when the cargo bed is not expanded.

3. A pick-up style utility vehicle comprising:
a front seat
a rear seat and
a cargo bed in this order from a front of the vehicle; and
a screen shield partitioning the cargo bed and a riding space in front of the cargo bed, wherein:
the cargo bed has at least a stationary bottom plate, right and left stationary side panels, a front panel movable into the riding space, expandable side panels expandable into the riding space, and an expandable bottom plate expanded into the riding space,
the cargo bed is changeable between an expanded state in which the cargo bed is expanded in a front direction into the riding space, and a non-expanded state not occupying the riding space, each of the expandable side panels and the screen shield or the expandable bottom plate and the screen shield are supported by a vehicle body configuring portion so as to be integrally shiftable between an expanded position and a non-expanded position, the expandable bottom plate is located in the riding space at all times, and is retracted underneath the rear seat when the cargo bed is not expanded, each of the expandable side panels is coupled to the front end of each of the stationary side panels so as to rotate about a vertical axis via a hinge and is shifted between the expanded position where the expandable side panel is protruded in a front direction from the stationary side panel and the non-expanded position where the expandable side panel is not protruded in a front direction from the front end of the stationary side panel, the screen shield is integrally formed with the front panel and is supported by the expandable bottom plate so as to slide in a front or rear direction, and the front panel and each of the expandable side panels are coupled by an interlocking mechanism.

4. A pick-up style utility vehicle comprising:
a front seat
a rear seat and
a cargo bed in this order from a front of the vehicle; and
a screen shield partitioning the cargo bed and a riding space in front of the cargo bed, wherein:

the cargo bed has at least a stationary bottom plate, right and left stationary side panels, a front panel movable into the riding space, expandable side panels expandable into the riding space, and an expandable bottom plate expanded into the riding space, the cargo bed is changeable between an expanded state in which the cargo bed is expanded in a front direction into the riding space, and a non-expanded state not occupying the riding space, each of the expandable side panels and the screen shield or the expandable bottom plate and the screen shield are supported by a vehicle body configuring portion so as to be integrally shiftable between an expanded position and a non-expanded position, each of the expandable side panels is supported by the vehicle body configuring member so as to slide in a front or rear direction, wherein the screen shield is fixed at or integrally provided with a front end of the expandable side panel, the vehicle body configuring member is the bottom plate and the expandable bottom plate, and the expandable side panel is located on an outer side of the stationary side panel in a vehicle width direction when the cargo bed is not expanded.

5. A pick-up style utility vehicle comprising:
a front seat
a rear seat and
a cargo bed in this order from a front of the vehicle; and
a screen shield partitioning the cargo bed and a riding space in front of the cargo bed, wherein:

the cargo bed has at least a stationary bottom plate, right and left stationary side panels, a front panel movable into the riding space, expandable side panels expandable into the riding space, and an expandable bottom plate expanded into the riding space, the cargo bed is changeable between an expanded state in which the cargo bed is expanded in a front direction into the riding space, and a non-expanded state not occupying the riding space, each of the expandable side panels and the screen shield or the expandable bottom plate and the screen shield are supported by a vehicle body configuring portion so as to be integrally shiftable between an expanded position and a non-expanded position, each of the expandable side panels is supported by the vehicle body configuring member so as to slide in a front or rear direction, wherein the screen shield is fixed at or integrally provided with a front end of the expandable side panel, the vehicle body configuring member is the bottom plate and the expandable bottom plate, and the expandable side panel is refracted in the stationary side panel formed in a hollow shape when the cargo bed is not expanded.

* * * * *